Nov. 20, 1962  J. B. WAGNER ET AL  3,064,435
CONTROL SYSTEM

Filed Aug. 14, 1961  9 Sheets-Sheet 1

INVENTORS
JAMES B. WAGNER
BY KENNETH O. STRANEY

Isidore Match
ATTORNEY

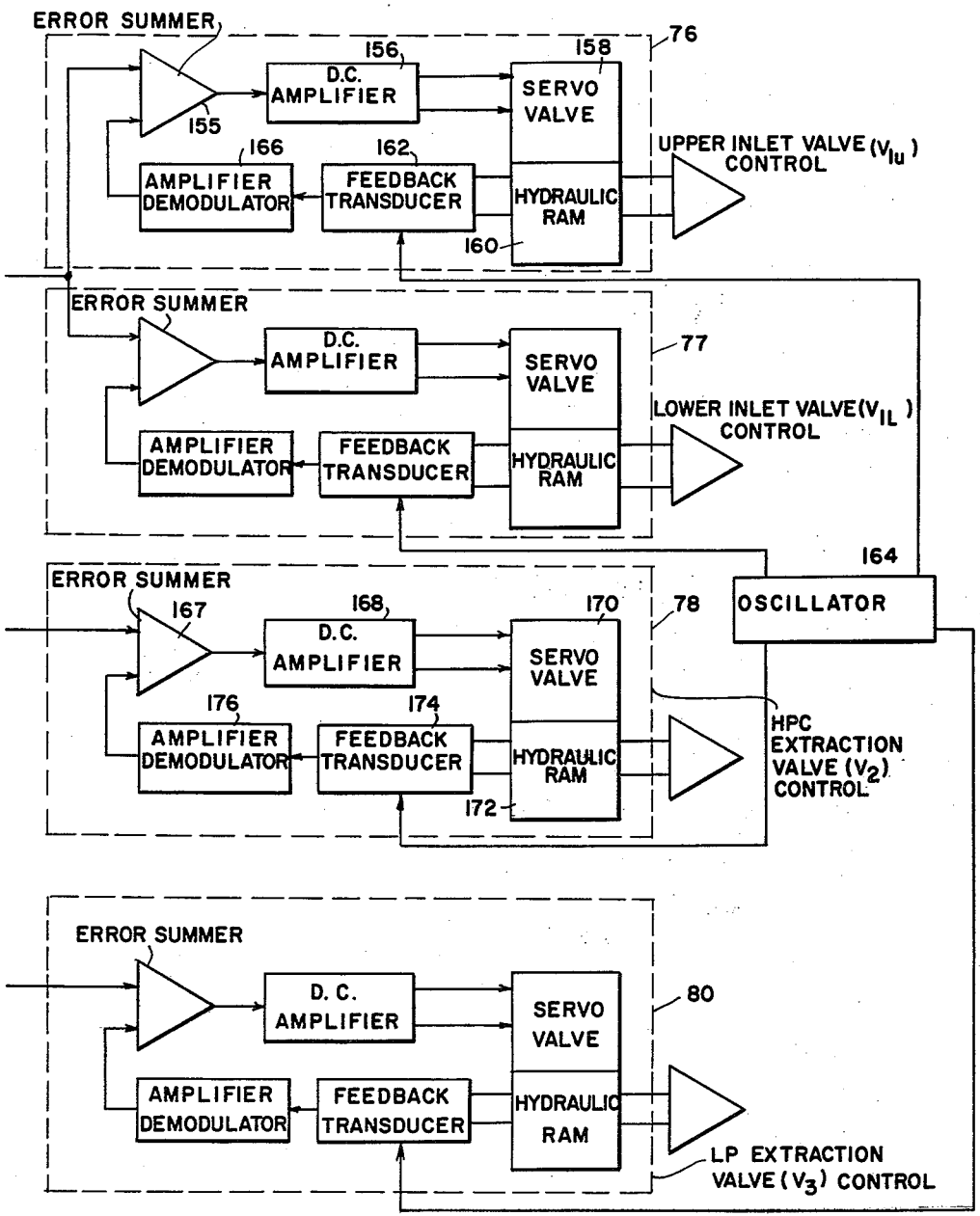
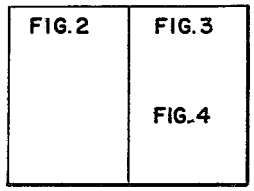
FIG.3

Nov. 20, 1962    J. B. WAGNER ET AL    3,064,435
CONTROL SYSTEM
Filed Aug. 14, 1961    9 Sheets-Sheet 5

INVENTORS
JAMES B. WAGNER
KENNETH O. STRANEY
BY
*Isidore Match*
ATTORNEY

INVENTOR.
JAMES B. WAGNER
KENNETH O. STRANEY
BY
Isidore Match
ATTORNEY

Nov. 20, 1962   J. B. WAGNER ET AL   3,064,435
CONTROL SYSTEM
Filed Aug. 14, 1961   9 Sheets-Sheet 8

INVENTORS
JAMES B. WAGNER
KENNETH O. STRANEY
BY
Isidore Match
ATTORNEY

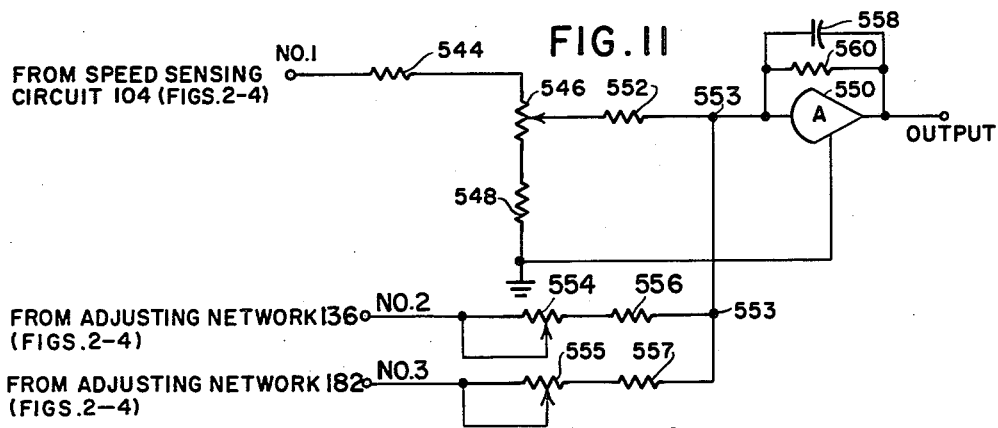
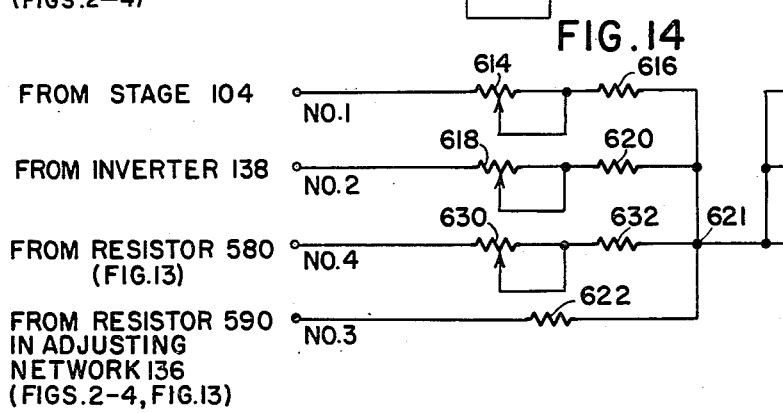
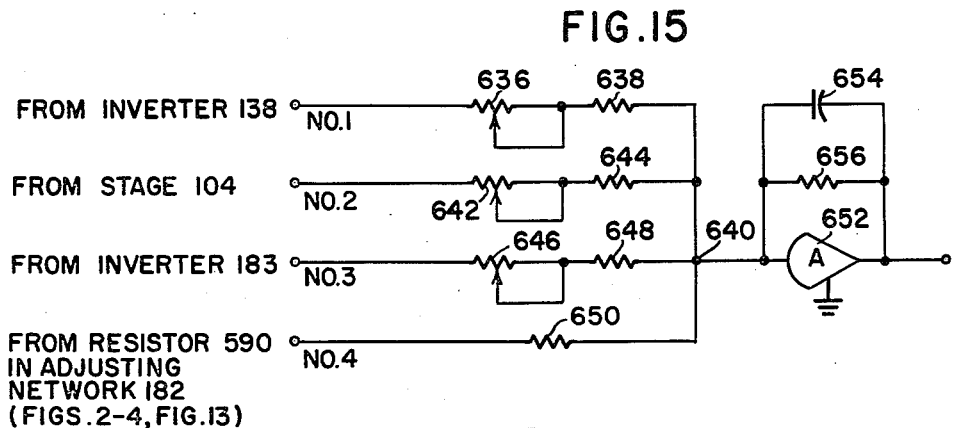
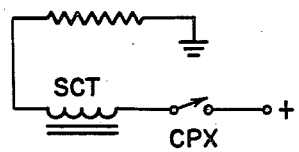

United States Patent Office

3,064,435
Patented Nov. 20, 1962

3,064,435
CONTROL SYSTEM
James B. Wagner, Lynnfield, and Kenneth O. Straney, Danvers, Mass., assignors to General Electric Company, a corporation of New York
Filed Aug. 14, 1961, Ser. No. 131,363
20 Claims. (Cl. 60—67)

This invention relates to control systems for elastic fluid turbines. More particularly, it relates to an electric control system suitable for use with multi-stage elastic fluid turbines of the plural extraction and mixed pressure type.

In multi-stage elastic fluid turbines of the type having a plurality of extraction conduits connected to a corresponding number of intermediate stages thereof for removing fluid therefrom under different intermediate pressures respectively, each of the stages to which the extraction conduits are connected has an interstage valve arrangement. Such valve arrangement is operatively associated and cooperates with the inlet valves of the turbine and the valve arrangements of the other extraction conduits to maintain substantially constant the pressure of the fluid in the extraction conduits respectively connected to such stages. Ordinarily, the fluid used is steam and the steam extracted from the turbine through these conduits is employed for some useful purpose such as process steam, heating, etc. When conduits are connected to intermediate stages of the turbine respectively for the purpose of being supplied with fluid either from these intermediate stages or from an external source, in such case, the intermediate stages are termed mixed pressure stages.

If only one conduit is connected to an intermediate stage comprising an interstage valve arrangement, then such turbine is designated as a single automatic extraction type turbine. If two conduits are connected to two different intermediate stages, each of the stages comprising respective interstage valve arrangements, then such turbine is generally described as a double automatic extraction type turbine.

In the operation of a double automatic extraction type turbine, the pressure in a first extraction conduit, i.e., the conduit proximal to the inlet valve, is greater than the second extraction conduit, the former being designated as the high pressure conduit and the latter being designated as the low pressure conduit.

When steam is extracted from the two intermediate stages of the double-extraction turbine during operation thereof, it is desirable to control the regulation provided by the inlet valves and the interstage valves in such a manner that speed of the turbine is maintained substantially constant irrespective of the changes on the load on the turbine and even though the requirements for extraction stream may vary considerably. Also, it is desirable to maintain pressure of the steam in the extraction conduits at respectively substantially constant values despite any changes in requirements for extraction steam and irrespective of changes in load.

Heretofore, the inlet valve and the interstage valves in a turbine such as above described have generally had to be controlled by mechanical linkages and mechanical mechanisms which are actuated in response to changes in the speed of the turbine shaft and changes in the pressure of the steam extraction conduits. Of necessity, such mechanical linkages have had to be massive and complex. This is in part due to the fact that a steam turbine is essentially a large device whereby the distance may be quite great between the output end of the turbine shaft where the speed control is located and the input and interstage valves. Furthermore, the distance between the input valves and the interstage valves may also be quite substantial as may be the distance between the points on the extraction conduits whereat pressures are sensed and the location of the controls for the input and interstage valves.

The speed with which such mechanical system can respond to changes in the requirement for extraction steam or to changes in turbine load is, of necessity, limited by the inertia of the control linkages as well as by the inertia of the operating components of the turbine. Thus, when rapid changes occur in load either on the shaft of the turbine or in the extraction steam conduits, any excessive delay in response may cause great damage to the turbine and components auxiliary thereto. Also, mechanical linkages and control systems are quite prone to get out of proper adjustment and thereby respond improperly to desired changes in operating conditions. Further, mechanical systems have to be operated at locations immediately adjacent to the turbine since they are not suitably adaptable for remote control and remote operation.

Mechanical systems and linkages present the further disadvantages in that programmed operation such as computer-regulated systems cannot readily be utilized to control the turbine so as to integrate the turbine or the extraction steam valves into a programmed system. Also, both the initial cost and the maintenance cost of mechanical systems are relatively high and the period that a turbine may be disabled by the breakdown and the consequent necessary repair of mechanical control systems is quite long whereby there results a very damaging expense to the turbine user.

At this present time, when the needs of turbine users have become more demanding since electrical power systems have become large and process needs have become more exacting, a limit is reached in the good design of mechanical control systems beyond which such needs cannot be satisfied thereby.

Accordingly, it is an important object of this invention to provide an improved control system for elastic fluid turbines of the double extraction type, i.e., an electrical control system having a high degree of reliability.

It is another object to provide an electrical control system for elastic fluid turbines of the double extraction type which has a relatively fast response time to changes in operating conditions.

It is still another object to provide an electrical control system for elastic fluid turbines of the double extraction type, such system providing improved accuracy of control both as to the speed of the turbine shaft and as to the respective pressures of the fluid in the extraction conduits with varying loads on the turbine shaft and varying requirements for process fluid.

It is another object to provide an electrical control system for an elastic fluid turbine of the double extraction type which can be readily remotely operated.

It is a further object to provide an electrical control system for an elastic fluid turbine of the double extraction type in which an improved flexibility of control is effected in combination with greater accuracy in control and faster rates of response, such controlling being enabled during actual operation of the turbine.

It is still a further object to provide an electrical control system for an elastic fluid turbine of the double extraction type which can be readily integrated with programmed systems.

It is yet a further object to provide an electrical control system for an elastic fluid turbine of the double extraction type which comprises active elements which are solid state devices whereby there is provided a very high degree of reliability and whereby required maintenance and repair of the control system is minimized.

Generally speaking and in accordance with the invention, there is provided in an elastic fluid multi-stage turbine which includes a rotatably mounted output shaft, inlet valve means governing the flow of fluid to the turbine, a first extraction conduit connected to a first intermediate stage of the turbine, a second extraction conduit connected to a second intermediate stage in the turbine, first interstage valve means governing the portion of fluid which flows through the first extraction conduit, second valve means governing the portion of fluid that flows through the second extraction conduit and first, second and third means for generating respective first, second and third signals. The first means is responsive to the speed of the output shaft, the first signal being a function of such speed; the second means is responsive to the pressure in the first extraction conduit, the second signal being a function of such first extraction conduit pressure; the third means is responsive to the pressure in the second extraction conduit, the third signal being a function of such second extraction conduit pressure. Means are also provided for modifying the first signal with the second and third signals, for modifying the second signal with the first and third signals and for modifying the third signal with the first and second signals, the modified first signal controlling the position of the inlet valve means, the modified second signal controlling the position of the first extraction valve means, and the modified third signal controlling the position of the second extraction valve means.

The features of this invention which are believed to be new are set forth with particularity in the appended claims. The invention itself, however, may best be understood by reference to the following description when taken in conjunction with the accompanying drawings which show an embodiment of a control system in accordance with the invention.

In the drawings, FIG. 1 is a schematic view partly in section of a multi-stage turbine provided with two intermediate stages to which there are respectively connected extraction conduits and having inlet valves and interstage valves associated therewith, and including the control system of this invention for three valves;

FIGS. 2 and 3 taken together as in FIG. 4 is a block diagram of the control system of the invention;

FIG. 11 is a diagram of a circuit suitable for use as the $V_1$ summer shown in block form in FIGS. 2–4;

FIG. 14 is a depiction of a suitable example of the $V_2$ summer shown in block form in FIGS. 2–4;

FIG. 15 is a schematic diagram of a suitable example of the $V_3$ summer shown in block form in FIGS. 2–4; and FIGS. 16 and 17 are schematic diagrams of circuits utilized in conjunction with the speed sensing and adjusting stage shown in FIGS. 2.4.

Figure 1:
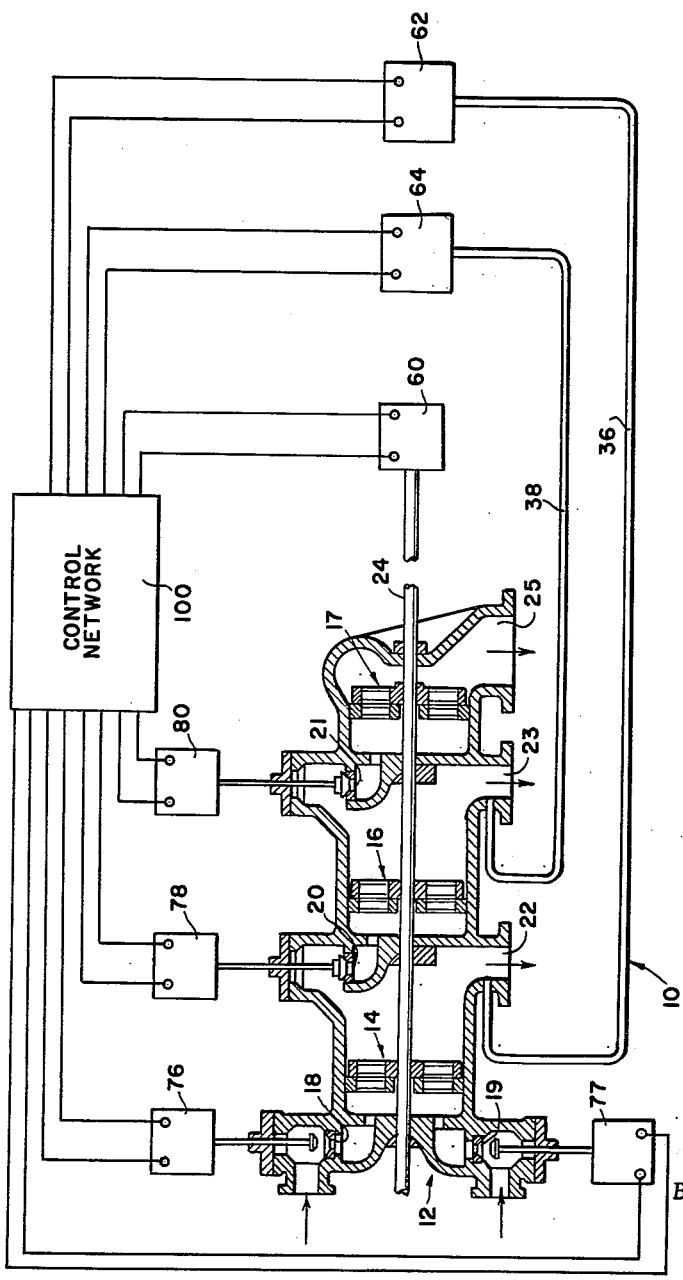

Referring now to FIG. 1, there is illustrated therein an elastic fluid double extraction turbine generally designated by the numeral 10 and wherein there are included high pressure and low pressure conduits together with the control system of this invention. Turbine 10 comprises a casing 12 supporting a rotatably mounted output shaft 24 and includes a plurality of stages, three representative stages being indicated respectively by the designating numerals 14, 16 and 17, stages 14, 16 and 17 respectively preceding each other.

In the arrangement shown, casing 12 carries the usual stationary diaphragms arranged in cooperating relationship with the usual wheels rigidly secured to the output shaft 24. Casing 12 is provided with upper and lower inlet valve means 18 and 19 respectively, interstage valve means 20 and interstage valve means 21, i.e., a high pressure extraction control valve means, and a low pressure extraction control valve means. Inlet valve means 18 and 19 control the flow of fluid from a boiler or other fluid source (not shown) to stage 14. Interstage valve means 20 controls the flow of elastic fluid from the highest stage 14 to the next stage 16, thereby governing the proportion of extraction fluid in the high pressure extraction conduit 22. Interstage valve means 21 controls the flow of elastic fluid from stage 16 to stage 17, thereby governing the proportion of extraction fluid in low pressure conduit 23. It is to be understood that inlet valve means 18 and 19 and interstage valves 20 and 21 in actual practice are each a multiple system of a multiplicity of mechanically co-acting units which open sequentially in response to a single input mechanical motion such as provided by a hydraulic ram actuator.

Casing 12 is further provided with an exhaust conduit 25 which may be connected to a condenser or utilization device (not shown).

The mechanical output of the turbine is taken from output shaft 24 in a suitable manner. For example, an electric generator (not shown) may be operatively connected thereto as a load.

In the control system of the invention, the motion of shaft 24 is applied to a transducer 60, suitably a permanent magnet generator, which serves to provide an electric signal that is a function of the speed of the shaft, the signal produced by transducer 60 being applied to a control network generally designated by the numeral 100. The pressure in the extraction conduit 22 is transmitted by means of a pipe 36 to a pressure transducer 62 which provides an electric signal that is a function of such pressure and the pressure in extraction conduit 23 is transmitted by a pipe 38 to a pressure transducer 64 which provides an electric signal that is a function of the latter pressure. The electric signals respectively produced by transducers 60, 62 and 64 are applied to control network 100 wherein they are combined in accordance with the principles of the control system of this invention to provide control signals that are respectively applied to servo-mechanisms 76, 77, 78 and 80. Servo-mechanisms 76 and 77 are connected respectively to the upper and lower inlet valve stems and servo-mechanisms 78 and 80 are connected to the stems of interstage valves 20 and 21 respectively, the servo-mechanisms thereby controlling valves 18, 19, 20 an 21 respectively.

Figure 2:
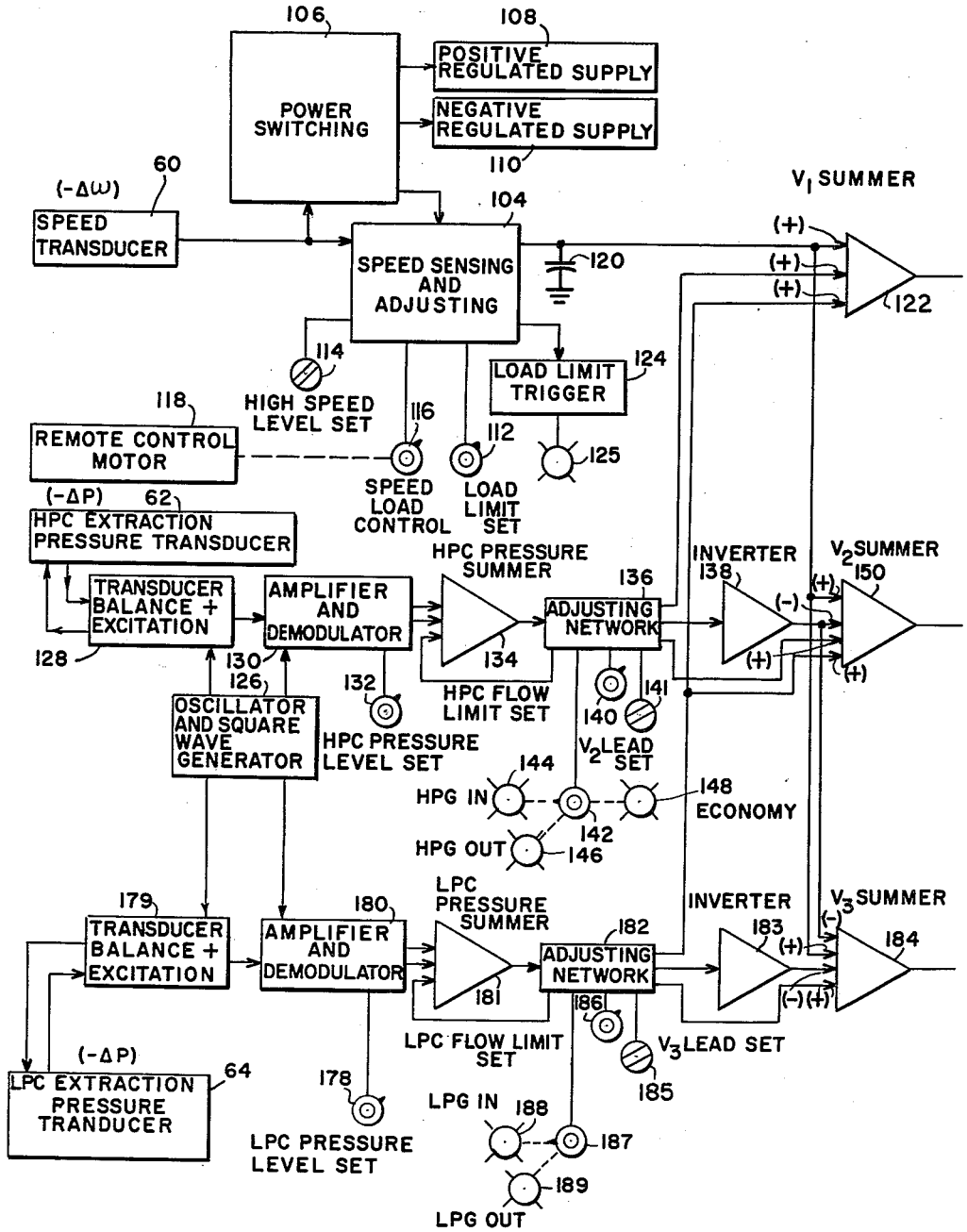

In FIGS. 2–4, there are shown in block form, the arrangement of the control system of the invention including the speed and pressure transducers 60, 62 and 64 and the speed and pressure servo-mechanisms 76, 77, 78 and 80. Shaft 24 actuates speed transducer 60 which provides a sinusoidal voltage output having an amplitude which is proportional to speed. Such transducer may suitably be a permanent magnet generator of the type well known in the art. For example, in the event that there is utilized a fourteen pole permanent magnet generator, i.e., comprising seven pairs of poles, the frequency of the sinusoidal wave output is seven times the revolutions per second of turbine shaft 24. Thus, with a shaft speed of 3600 revolutions per minute, i.e., 60 revolutions per second, speed transducer 60 provides a sinusoidal output voltage having a frequency of 420 cycles per second.

The A.C. voltage output produced by speed transducer 60 is applied both to a speed sensing and adjusting stage 104 and to a power switching stage 106.

To understand the function of power switching stage 106, it is to be realized that the voltage output from transducer 60 is utilized as the supply voltage for the components of the control system of FIGS. 2–4. Such voltage is, of course, produced when turbine shaft 24 is rotating. In the event that turbine shaft rotation is not occurring, power switching stage 106 enables the utilization of the readily available line A.C. voltage for initially actuating such electrical system. Stage 106 itself may be powered by an A.C. voltage suitably transformed down from the line voltage to one having a smaller amplitude, such as about 24 volts with the same 60 cycles per second frequency.

It is seen in FIGS. 2–4 that the output of power switching stage 106 is applied as a supply voltage to a stage 108 which provides a positive regulated voltage supply such supply suitably having a value of +30 volts and to a stage 110 which provides a regulated negative voltage supply which may have a value such as about −14 volts, stages 108 and 110 being the undirectional supply voltages for the components of the system.

Speed sensing and adjusting stage 104 produces an output D.C. voltage having an amplitude which is, in general, proportional to the frequency of the A.C. voltage produced at the output of speed transducer 60. A knob 116 enables the external controlling of a potentiometer contained in stage 104 which is set to provide a voltage level about which variations of turbine speed are referenced. Knob 116 enables the controlling of the setting on such potentiometer by an outside agency such as the system operator. A maximum adjustable reference voltage level is enabled to be provided by the setting of a high speed level set potentiometer, such setting being controlled by a screw adjustment 114, the latter setting providing a maximum speed level for turbine shaft 24 with no load. The setting on this high speed level set potentiometer is preferably initially made when the system is adjusted for operation and, thereafter, this setting is not changed by the operator.

A knob 112 is provided to enable the control by an operator of the setting of a load limit set potentiometer contained in stage 104, the setting of the latter potentiometer functioning to limit the maximum positive voltage which may be provided at the output of stage 104. Accordingly, the load limit set potentiometer limits the maximum degree of opening possible of the upper and lower inlet valves $V_{1U}$ and $V_{1L}$ and the extraction valves $V_2$ and $V_3$ respectively in response to shaft speed changes and load independent of the settings of the potentiometers associated with screw 114 and knob 116.

A remote controlled motor 118 may be associated with knob 116 to permit remote positioning of the setting of the potentiometer externally controlled by knob 116. The latter potentiometer, i.e., the speed load control potentiometer, is initially adjusted to provide a selected shaft speed with no load. After synchronization of turbine speed in an electric power network, it is then further adjusted to provide a desired load level for the turbine.

The circuit elements of speed sensing and adjusting stage 104 are so arranged and their values are so chosen that the output thereof which is a D.C. signal decreases with increasing turbine speed.

The output of stage 104 is applied as one input to an adder network 122, legended $V_1$ summer. The $V_1$ summer and the other summers in the system depicted in FIGS. 2–4 may suitably be operational amplifiers arranged to function as adders or passive resistance network adders which are respectively operatively associated with D.C. amplifiers. The other inputs to $V_1$ summer 122 are further explained hereinbelow.

The output of speed sensing and adjusting stage 104 is also applied as an input to a load limit trigger stage 124. The function of stage 124 is to provide an indication as to whether the output of speed sensing and adjusting stage 104 is being limited in accordance with the setting of the potentiometer associated with knob 112, i.e., whether a voltage is being provided from stage 104 which in the absence of such potentiometer and associated circuitry would be greater than the voltage as determined by such potentiometer. In the event that such limiting is actually occurring, an indication such as the lighting of the lamp 125 is provided by load limit trigger stage 124. The output of stage 104 is also applied as an input to the $V_2$ summer 152 and the $V_3$ summer 153, i.e., the summers in the high pressure and low pressure extraction channels, the operations of which are further explained hereinbelow.

It is thus appreciated that the output of speed sensing and adjusting stage 104 is a D.C. signal which varies about a fixed reference level as dictated by changes in turbine shaft speed and is equal to or less than the voltage of the voltage provided by the setting on the potentiometer associated with knob 112. Since, the control provided by the load limit potentiometer can "override" the speed control, there is thereby maintained a fixed load independent of normal speed variations. The load limit potentiometer setting is accordingly a top or "ceiling" control which permits the turbine valves to be closed completely in the event of a sufficient rise in turbine speed.

Referring now to the middle or high pressure extraction channel of FIGS. 2–4, there is shown extraction pressure transducer 62 which suitably may be a Bourdon tube differential transformer type transducer which provides an output signal proportional to the pressure in high pressure extraction conduit 22.

Extraction pressure transducer 62 is excited by a signal which suitably may be a 2.5 k.c. sinusoidal voltage which is produced at the output of the oscillator and square wave generator stage 126. In the stage 128, legended as transducer balance and excitation, the output of transducer 62 is balanced to a null through a null balance network. The output of stage 128 is a signal of a frequency of oscillator 126, modulated by the signal which is a function of changes in the extraction pressure from such null pressure. In extraction pressure transducer 62, a relatively gross adjustment may be made to provide a substantially zero voltage at a desired base or operating "high pressure." Stage 128 then comprises a suitable circuit which can be utilized to finely adjust the voltage to zero at such operating pressure. As is further explained hereinbelow, the null voltage is desirably obtained at the highest desired pressure in the high pressure conduit.

In stage 130, legended as an amplifier and demodulator, there is applied the output of stage 128 together with the square wave produced at the output of oscillator and square wave generator 126. In the amplifier portion of stage 130, the output of stage 128 is amplified. The square wave output from stage 126 is mixed with such amplified output thereafter to chop any amplified signal resulting from a deviation from the chosen null pressure, such chopped signal including a unidirectional component. The chopped signal is filtered whereby at the output of stage 130, there is provided a substantially unidirectional signal which is indicative of a pressure deviation signal from the null condition.

A pressure level set potentiometer whose setting may be externally controlled by a knob 132 is included in stage 130 to provide a chosen reference voltage level which represents a pressure level for which it is desired that the system operate at. Such latter pressure, of course, cannot exceed the null level initially chosen. A chopper demodulator is suitably utilized in stage 130 rather than a rectifier to insure that in the event that the pressure does exceed such null pressure, the unidirectional potential output of stage 130 is reversed in sign when such excess pressure occurs. In other words, a negative voltage is provided in the latter situation.

The output of stage 130 is applied as first, and second inputs to a pressure summer stage 134 which may suitably be an operational amplifier arranged to function as an adder, or a passive resistance network operatively associated with a D.C. amplifier. A third input to pressure summer 134 is from the adjusting network 136 and is suitably a bias voltage to the D.C. amplifier in pressure summer 134 which causes pressure summer 134 to operate as a limiting summer. The functional effect of such bias voltage is to set a maximum flow limit through the high pressure extraction conduit. This is accomplished by providing a maximum voltage level indicative of a maximum flow.

The output of pressure summer 134 is a unidirectional voltage which represents a deviation from the null selected by the setting of the pressure level set potentiometer and also represents a flow limit not exceeding the chosen maximum. Pressure summer 134 also suitably provides a limiting function for such maximum, i.e., the selected null pressure. This is accomplished by circuitry which insures that any pressure exceeding the null pressure results in no output from pressure summer 134.

From adjusting network 136, there is provided a first output which is applied as an input to $V_1$ summer 122, the latter actually being the output appearing at the output of pressure summer 134. There is further provided a second output from network 136 which represents an algebraic addition of the voltage of the output of pressure summer 134 and the voltage taken from a potentiometer whose setting may be externally controlled by a knob 140. The resultant of this algebraic addition is the flow limit set voltage which is applied as the third input to pressure summer 134. A third output from adjusting network 136 which is the same as its first output, i.e., the output of pressure summer 134 which is applied to $V_1$ summer 122, is applied to an inverter 138, the output of which is equal to, but opposite in sign to the first output of adjusting network 136. Inverter 138 is suitably a D.C. amplifier having a gain of unity.

A fourth output from adjusting network 136 is a voltage which is obtained from a potentiometer in adjusting network 136 that may be initially set with screw 141. The latter potentiometer is the $V_2$ lead set potentiometer and its setting is chosen to provide a voltage whereby the initial position of the stem of extraction valve $V_2$ is adjusted relative to the positions of the stems of the inlet valves $V_{1U}$ and $V_{1L}$. The output from inverter 138 is applied as an input to the $V_3$ summer 184, the other inputs to $V_3$ summer 184 being the output of speed sensing adjusting stage 104, the output of an inverter 183 and the output of the adjusting network 182 in the low pressure extraction channel as will be further explained hereinbelow.

In connection with the voltage provided from the potentiometer associated with screw 141, knob 142 enables the increasing of such voltage by a large step in magnitude when it is rotated to the economy position to open extraction valve $V_2$ by a large amount.

Knob 142 is associated with two potentiometers in adjusting network 136, viz., an economy potentiometer and a pressure governor in-out potentiometer, and with a potentiometer in adjusting network 182, i.e., the economy potentiometer therein, the three potentiometers being ganged whereby rotation of knob 142 in a chosen direction simultaneously advances both the high pressure conduit and low pressure conduit valves a prescribed amount. Lights 144 and 146 indicate the positions of the pressure governor potentiometer and light 148 indicates the position of the economy potentiometers. Pressure governor "in" indicates that pressure is being controlled in the high pressure conduit and pressure governor "out" indicates that no control of pressure is being performed in the high pressure conduit, i.e., all of the valves in the turbine are not responsive to pressure changes in the high pressure conduit. Economy operation is generally employed only when the turbine is operated with no controlled extraction flow, i.e., with no control of either extraction conduit pressure. The ganging of the potentiometers insures such operation.

In the low pressure extraction channel, the low pressure extraction transducer stage 64, the transducer balance and excitation stage 179, the amplifier and demodulator stage 180, the low pressure conduit pressure summer 181, the adjusting network 182 and the inverter 183 are stages which are substantially similar to corresponding stages in the high pressure channel. Thus, the output of transducer balance excitation stage 179 is a null voltage which is desirably attained at the highest desired low extraction pressure. The setting on a pressure level set potentiometer contained in amplifier and demodulator stage 180 and which is externally controllable by knob 178 provides the selected reference voltage level which represents the low pressure level at which it is desired that the system operate, this pressure of course not exceeding the null level initially selected.

In adjusting network 182, screw 185 is adapted to control the setting of a potentiometer contained in adjusting network 182 which determines the initial position of the low pressure extraction valve stem $V_3$ relative to the inlet valves' stems. A knob 186 may be utilized to externally control the setting of a potentiometer contained in adjusting network 182 which when added algebraically to the voltage of the output of pressure summer 181 provides the flow limit set voltage that is provided as an input to pressure summer 181. A knob 187 may be utilized to externally control a pressure governor in-out potentiometer contained in adjusting network 182, lights 188 and 189 indicating the position of the pressure governor potentiometer.

The outputs of adjusting network 182 are a first output which is the output of pressure summer 181 and which is applied as an input to $V_1$ summer 122, $V_2$ summer 150, and inverter 183, a flow limit output which is applied as an input to pressure summer 181 and the valve $V_3$ lead set output which is applied as an input to $V_3$ summer 184. The output of inverter 183 is equal to and opposite in sign to the output of adjusting network 182 which represents the output of pressure summer 181 that is applied as an input to $V_1$ summer 122 and $V_2$ summer 150.

The inputs to $V_3$ summer 183 are accordingly the output of speed sensing and adjusting stage 104, the outputs of inverters 138 and 183 and the valve $V_3$ lead set output from adjusting network 182.

In considering the operation of the system described thus far, it is seen that the output of $V_1$ summer 122 is the resultant of the summation of a first component that is a voltage representing the desired speed of operation and the error from that operation, a component that is a voltage representing the desired pressure in the high pressure extraction conduit and the deviation from such pressure and the desired pressure in the low pressure extraction conduit and the deviation from such pressure.

The output of $V_2$ summer 150 is D.C. voltage which represents the desired position of the extraction valve $V_2$ and is a combination of four components; a first component that is a voltage that is provided from the output of speed sensing and adjusting stage 104 and which represents a desired speed and error from that speed, a second component provided from pressure summer 134 through adjusting network 136 and inverter 138 and which represents a desired high pressure extraction conduit pressure and error from that pressure, a third component that is provided from adjusting network 136 which represents the initial indexing or lead position of the high pressure extraction valve $V_2$ relative to the position of the inlet valves and a fourth component which is provided from the output of pressure summer 181 through adjusting network 182 and which represents the desired low pressure extraction conduit pressure and error from that pressure.

In FIGS. 2–4, it is noted that the output of inverter 138 applied to $V_2$ summer 150 is a corresponding voltage quantity but opposite in sign to the voltage quantity applied to $V_1$ summer 122. Thus, if it is assumed that there is a drop in pressure in the high pressure extraction conduit as legended $-\Delta P$, the resulting output from inverter 138 and its corresponding opposite sign output from adjusting network 136 applied as an input to $V_1$ summer 122 causes the inlet valves to open as seen by the (+) signal to $V_1$ summer 122, while the extraction valves $V_2$ and $V_3$ are caused to close as shown by the (−) signal to $V_2$ summer 150 and the $V_3$ summer 184. The values of the components in the various stages are so chosen as to maintain kilowatt load and low pressure extraction opening pressure constant while effecting an increase in flow at the high pressure extraction opening to compensate for such pressure drop.

The output of $V_3$ summer 184 is a D.C. voltage which represents the desired position of extraction valve, $V_3$ and is a combination of four components; a first component which is a voltage that is provided from the output of the speed sensing and adjusting stage 104 and which represents the desired speed and error from such speed, a second component provided from the output of inverter 138 which represents the desired high pressure extraction conduit pressure and error from that pressure, a third component which represents the initial indexing or lead position of the extraction valve, $V_3$, relative to the position of the inlet valves $V_{1U}$ and $V_{1L}$ and a fourth component which is a voltage provided at the output of inverter 183 and which represents the desired low pressure extraction conduit pressure and error from that pressure.

It is noted that the outputs of inverters 138 and 183 are both applied as inputs to $V_3$ summer 184 This signifies that in the event that the pressure drops in the high pressure extraction conduit, it is necessary to cause both of the extraction valves $V_2$ and $V_3$ to move in the closed direction and to cause the inlet valves $V_{1U}$ and $V_{1L}$ to move in the open direction to maintain the respective pressures in both conduits at the desired levels without affecting the power delivered to one shaft. However, in the event that the drop in pressure occurs only in the low pressure extraction conduit, in this situation, it is seen that a voltage that is equal in value but opposite in sign, to the output of inverter 183 is applied to $V_1$ summer 122 and $V_2$ summer 150. In the latter situation the inlet valves $V_1$ and the high pressure conduit extraction valve are caused to move in the open direction and the low pressure conduit extraction valve is caused to move in the closed direction.

As has been explained in connection with the high pressure extraction channel, economy operation is effected by the economy potentiometers in adjusting networks 136 and 182 respectively which are ganged and which are externally controlled by knob 142. In such economy operation, i.e., minimum throttling losses due to fluid flow through both extraction valves $V_2$ and $V_3$ ("straight condensing operation"), provision is made for sufficiently opening both valves $V_2$ and $V_3$, to positions in accordance with the particular design whereby there results a negligible pressure drop across both extraction valves $V_2$ and $V_3$. Of necessity, when there is economy operation in the high pressure extraction channel, economy operation is also being effected in the low pressure extraction channel.

The output of $V_1$ summer stage 122 is applied to like servo-mechanisms 76 and 77 which function to control the position of the upper and lower inlet valves. Since the servo-mechanisms function in like manner only the operation of servo-mechanism 76 is described hereinbelow.

Specifically the output of $V_1$ summer 122 is applied as one input to an error summer 155 which may suitably be a passive resistance network operatively associated with a D.C. amplifier or it may be a high gain operational amplifier arranged to function as an adder and providing a 180° phase shift.

The output from error summer 155 is applied to a D.C. amplifier 156. D.C. amplifier 156 is preferably chosen to have a high gain with sufficient power output to drive the torque motor coils of a servo-valve 158. If error summer 155 is chosen to be an operational amplifier, then D.C. amplifier 156 should suitably have sufficient gain to provide the necessary power to drive the aforesaid torque motor coils. If the torque motor coils are driven in push-pull, then there is required a double ended output from D.C. amplifier 156. If the torque motor coils are connected for parallel operation, then D.C. amplifier 156 need only have a single ended output.

The ouput of D.C. amplifier 156 is applied to hydraulic servo-valve 158, such output being applied to a torque motor associated with the valve. Valve 158 may be of the conventional torque motor type used in servo-valve construction and having one or two coils. Servo-valve 158 may be of the four-way action type, and of the type in which there is supplied oil thereto under high pressure and its function is to control a hydraulic ram 160. The flow rate through servo-valve 158 is proportional to the current delivered from the output of amplifier 156. The size of ram 160 is chosen such that it can provide the force requirements to operate the stem of input valve 18 shown in FIG. 1.

The position of hydraulic ram 160 is translated to a voltage by means of a feedback transducer 162. Feedback transducer 162 may suitably be of the well known variable reluctance type wherein the position of a magnetic slug determines the inductance of two halves of a continuous winding. When such inductance is measured in a standard bridge circuit, there is produced an A.C. output therefrom having an amplitude determined by the position of the slug. The bridge circuit is balanced to produce a null output for the fully closed ram position. The completely closed position of a ram signifies the completely closed position of a valve plus any mechanical over travel provided in the connecting mechanisms between a ram and a valve. As is shown in FIGS. 2–4, transducer 162 is powered by an oscillator 164.

The A.C. voltage output of transducer 162 is amplified in amplifier demodulator stage 166 and such amplified voltage is then demodulated. The amplifier in stage 166 is, of course, an A.C. amplifier. The demodulator suitably includes a filter and may be a rectifier or a phase sensitive detector for converting the output of the A.C. amplifier to a unidirectional potential which accurately represents the position of the ram. The arrangement of the circuit components of amplifier demodulator stage 166 are so chosen whereby the output voltage of this stage is opposite in sign to the sign of the output voltage from $V_1$ summer 122. The total amplification in amplifier demodulator stage 166 is chosen such that there is produced a voltage corresponding to full stroke motion of hydraulic ram 160 in accordance with a particular design of the control system of the invention. Such voltage, for example, may be five volts in a given design. By "full stroke" motion is meant movement from the completely closed to the completely open position of the ram.

In error summer 155, the unidirectional potential outputs of amplifier demodulator stage 166 and $V_1$ summer 122 are algebraically added. Thus, any output from error summer 155 is an error voltage which effects the adjustment of the position of the inlet valve to a position which reflects the voltage output of $V_1$ summer 122.

The servo loop such as loop 76 is included in the system of the invention to produce a position of a valve (in this situation the position of upper inlet valve $V_{1U}$) substantially exactly proportional to the position represented by the output of $V_1$ summer 122, substantially independent of reaction forces on the inlet valve. It is readily recognized that these reaction forces are quite great and may be in the order of many thousands of pounds. In addition, there may be regions of abrupt negative force gradients. The position feedback servo-mechanism such as loop 76 accordingly insures accurate positioning of a valve substantially independent of the strength and the non-linearities of these reaction forces.

Servo-mechanisms 78 and 80 in the high and low pressure channels respectively are substantially alike and similar to servo-mechanisms 76 and 77. Accordingly, only the operation of servo-mechanism 78 is described.

In servo-mechanism 78, the output of $V_2$ summer 150 is applied as an input to an error summer 167, the output of which is applied to a D.C. amplifier 168. The output of amplifier 168 is applied to the torque motor coils of a servo-valve 170. Upon actuation of valve 170, oil under pressure is fed to a hydaulic ram 172 which is connected to the valve stem of extraction valve, $V_2$. Here again, as with the inlet valves, the flow rate is proportional to the current delivered from the output of amplifier 168. Ram 172 is chosen to have a size such that it can impart the necessary force requirements to the valve stem of extraction valve $V_2$.

Changes in the position of hydraulic ram 172 from an initial set position, preferably the closed position, and, therefore, consequent changes of the extraction valve $V_2$ from the corresponding set position cause the generation of a voltage by a feedback transducer 174 proportional to the actual opening of the extraction valve.

The A.C. voltage output of transducer 174, which is also powered by oscillator 164, is applied to an amplifier demodulator stage 176 wherein it is amplified and demodulated and thereafter filtered to remove the A.C. component therefrom.

The unidirectional potential output of amplifier demodulator stage 176 is then applied as the other input to error summer 167. As has been sttaed hereinabove, the elements comprising servo loop 78, may be chosen to be similar to the corresponding elements of servo loops 76, 77 and 80 and the circuit values may also be the same so that loop 78 functions in the same manner as loops 76, 77 and 80 for the correspondingly similar purpose.

*Speed Sensing and Load Adjusting (FIG. 5)*

Figure 5:
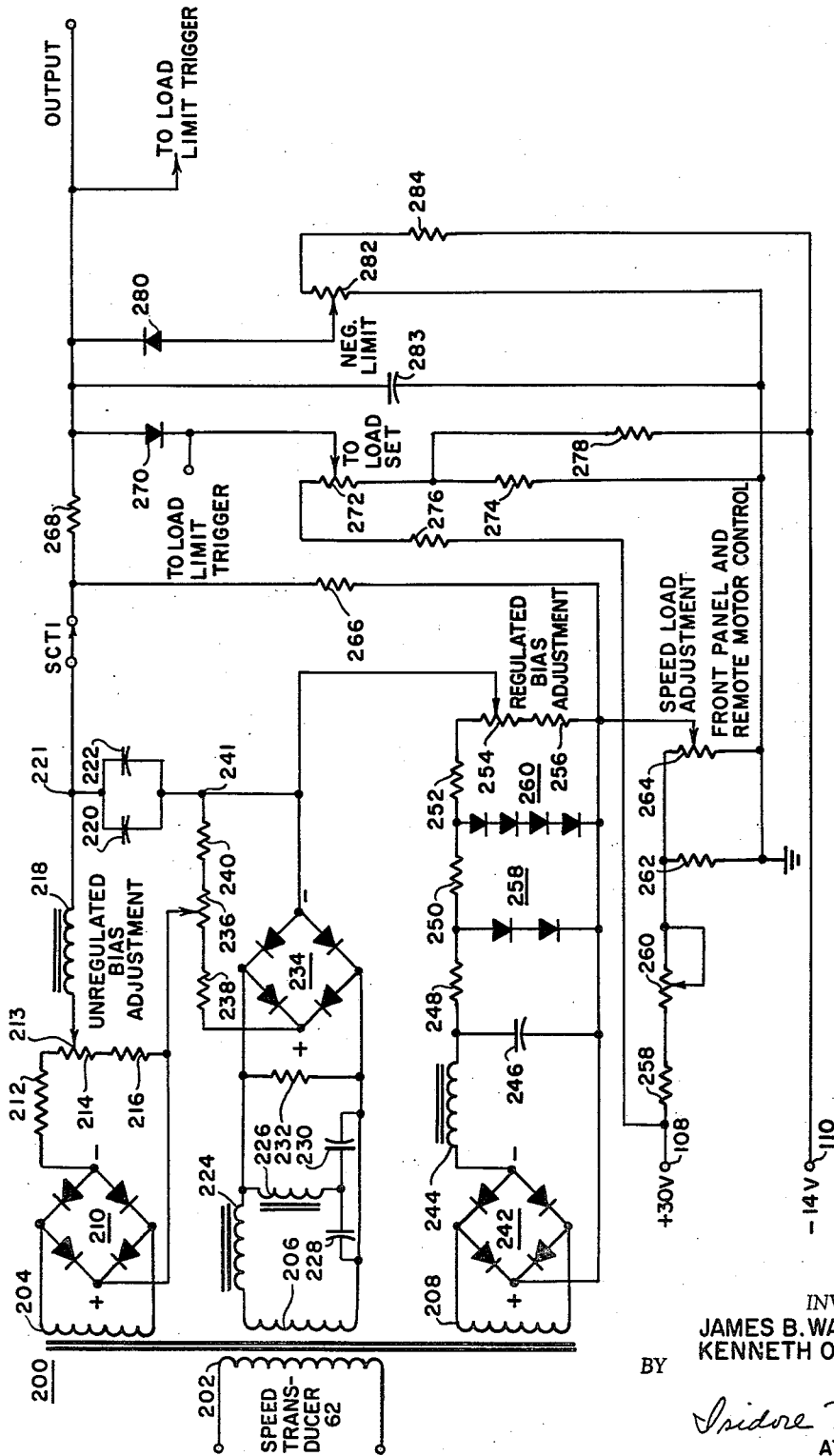
FIG. 5 is a schematic diagram of an example of the speed sensing and adjusting stage shown in FIGS. 2–4.

The circuit of FIG. 5 which may be utilized as speed sensing and load adjusting stage 104 is described for convenience of explanation as comprising three sections, viz., those sections associated with secondary winding portions 204, 206 and 208 of transformer 200, the signal produced at the output of the permanent magnet generator, i.e., speed transducer 60 (shown in FIGS. 1-4) being applied to the primary winding 202 of transformer 200.

The section associated with secondary winding portion 204 produces an A.C. voltage having an amplitude directly proportional to the amplitude of a voltage produced from the permanent magnet generator. In this section, the voltage across secondary winding portion 204 is full wave rectified in rectifier 210 and then is applied through a resistor 212 and across a series combination comprising a variable resistor 214 and a resistor 216. A portion of the voltage across resistors 214 and 216 is filtered by inductor 218 and capacitors 220 and 222. As is stated in the legend, the voltage taken via a tap from resistor 214 is the unregulated bias adjustment voltage. Such voltage is chosen whereby, at a desired operating speed, a voltage between junction points 221 and 241 is zero as will be further explained.

The section associated with secondary winding portion 206 produces a voltage which is both proportional to the amplitude and the frequency of the voltage produced at the output of permanent magnet generator 60. In this section, the frequency sensitive elements are series connected inductor 224, parallel connected inductor 226 and capacitors 228 and 230. The values of these elements are co chosen whereby inductors 224 and 226 resonate with capacitors 228 and 230 at a frequency below the operating range of the turbine and inductor 226 resonates with capacitors 228 and 230 at a frequency above the operating range of the turbine. Consequently, the voltage developed across resistor 232 is at a maximum at the lower resonating frequency and at a minimum at the higher resonating frequency.

The voltage developed across resistor 232 is rectified in full wave rectifier 234 and also filtered by capacitors 220 and 222 and inductor 218. A portion of the output taken from a point on a variable resistor 236 which is connected in series with resistors 238 and 240 is compared with the voltage at the output of the section associated with secondary winding 204. As is stated in the legend on the drawings, the voltage taken by a tap at resistor 236 is the speed regulation adjustment voltage. This voltage is adjusted to provide the desired rate of change with speed of the turbine shaft in accordance with the requirements of the speed load regulation for the turbine and its shaft load.

The section associated with secondary winding portion 208 produces a D.C. output voltage whose amplitude is independent of the amplitude and frequency of the voltage produced by permanent magnet generator 60 above a given r.p.m. value, such independence being effective at a voltage level which is at least slightly less than the level produced at a chosen value such as about 3,000 r.p.m. In this section, the voltage appearing across secondary winding portion 208 is rectified in rectifier 242 and is filtered in series connected inductor 244 and parallel connected capacitor 246. The output is developed across the series combination comprising a resistor 252, a variable resistor 254 and a resistor 256. The bank of diodes generally designated by numerals 258 and 260 respectively may be of the Zener type and provide proper desired voltage regulation and compensation for temperature effects. Resistors 248 and 250 are source impedances for the banks of Zener diodes respectively. The regulated bias adjustment voltage, taken from resistor 254, is chosen to have a value such that zero voltage appears across the contacts SCT-1 of a relay SCT when the speed is at for instance 3,000 r.p.m. and the impending closure of contacts SCT-1 is about to be attained.

To understand the operation of the circuit of FIG. 5 to the extent that it has been described, it is seen that the voltage appearing at point 213 tends to increase substantially linearly in the negative direction as the amplitude of the voltage produced by the permanent magnet generator increases. When this voltage is combined with the voltage provided from variable resistor 236, a voltage is produced which decreases from a maximum point to a minimum point across the operating range of the turbine, the zero crossover point being chosen to be substantially at the desired normal operating point in the frequency range, such as about 3,600 r.p.m. Thus, by adding the substantially constant negative voltage provided at variable resistor 254, the aforesaid zero crossover point is moved to the 3,000 r.p.m. point.

Also provided in the circuit of FIG. 5 is an arrangement for providing an adjustable voltage derived from regulated D.C. sources 108 and 110 (FIGS. 2-4). This circuit comprises a resistor 258 and a variable resistor 260 connected in series with the positive terminal of source 108 and a parallel connected resistor 262. Variable resistor 260 is the high speed level set potentiometer adjusted with screw 114, as shown in FIGS. 2-4. The desired voltage may be taken by a tap from a variable resistor 264. The value of the voltage provided from variable resistor 254 and the value of resistor 266 are so chosen respectively that when contacts SCT-1 close due to the energization of relay SCT (relay SCT is energized when the turbine attains a speed of about 3,000 r.p.m.), there is no voltage difference across these contacts. Variable resistor 261 is the potentiometer which is controlled externally by knob 116 (FIGS. 2–4) and provides the adjustable reference voltage which determines desired operating speed.

The voltage applied through closed contacts SCT–1, i.e., the voltage developed at resistor 264 minus the voltage drop across resistor 266 is applied through a resistor 268 and appears at the anode of a diode 270, diode 270 being connected to common through a tap on a variable resistor 272 and a resistor 274. One terminal of resistor 272 is connected to the positive D.C. source 108 through a resistor 276 and its other terminal is connected to the negative D.C. source through a resistor 278. As legended in FIG. 5, the cathode of diode 270 is connected to the load limit indicator circuit. Variable resistor 272 is the potentiometer which may be externally controlled by the load limit set knob 112 shown in FIGS. 2–4. Variable resistor 272 may be set to a desired value by such knob and diode 270 limits the voltage appearing at its anode to the value of the voltage at the point at which resistor 272 is set. The load limit trigger circuit is explained hereinbelow.

A diode 280 has its anode connected to common by a tap on a variable resistor 282 and is connected through such tap and a resistor 284 to negative D.C. source 110. Diode 280 is included to insure that no negative voltage appears at the output of the circuit, the voltage appearing at the tap point on resistor 282 being chosen for this purpose. Capacitor 283 serves as a noise filter.

It is seen that the circuit of FIG. 5 provides a D.C. voltage having an amplitude proportional to desired speed and to change from desired speed. By means of diode 270, an upper limit is placed on such voltage and with diode 280 there is insured that no negative voltage appears at the output. The arrangement whereby there is substantially no voltage across contacts SCT–1 when they close (when the system is switched from auxiliary power to the power provided by the permanent magnet generator) serves to substantially minimize the possibility of an undesirable "step" (jump in the position of the inlet valves during starting conditions when there is no load on the turbine shaft).

*Power Switching (FIG. 6)*

Figure 6:
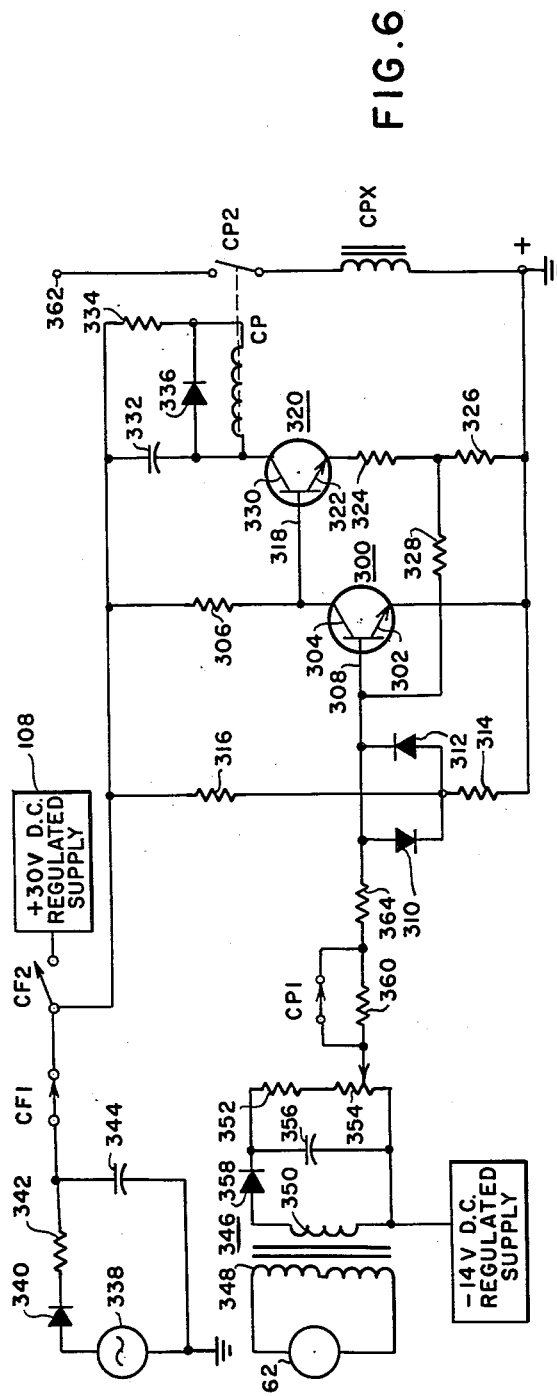
FIG. 6 is a schematic depiction of an example of the power switching stage shown in FIGS. 2–4.

Reference is now made to FIG. 6 which is a schematic diagram of a circuit suitable for use as power switching stage 106 of FIGS. 2–4.

In this circuit, transistor 300 has its emitter 302 connected to common and its collector 304 connected to one of a pair of normally open contacts CF2 associated with the circuit fault relay CF (not shown) through a resistor 306, the other of the pair of contacts being connected to regulated positive D.C. voltage supply 108. The base 308 of transistor 300 is connected to common through the parallel arrangement of oppositely poled diodes 310 and 312 and a resistor 314 and to contacts CF2 through the junction of diodes 310 and 312 and a resistor 316. Collector 304 is directly connected to the base 318 of a transistor 320.

The emitter 322 of transistor 320 is connected to common through a voltage divider arrangement comprising resistors 324 and 326, base 308 being connected to the junction of resistors 324 and 326 through a resistor 328. The collector 330 is connected to contacts CF2 through the parallel combination of a capacitor 332 and the series arrangement of the coil of a relay CP (Control Power) and a resistor 334, a diode 336 being provided across the coil of relay CP and poled as shown.

Connected to contacts CF2 is a source 338 of alternating current potential which may have a frequency of 60 c.p.s. and a voltage of 24 volts, such potential suitably being provided from the stepped down output of a line voltage source 338, one terminal of source 338 being grounded. In series connection with the other terminal of source 338 is a forward biased diode 340, a resistor 342 and normally closed contacts CF1 of the circuit fault relay CF. The junction of resistor 342 and contacts CF1 is connected to common through a capacitor 344.

The output of permanent magnet generator 60 (FIGS. 2–4) is applied to the primary winding 348 of a transformer 346. Connected across secondary winding 350 of transformer 346 is a series arrangement of a resistor 352 and a variable resistor 354. A capacitor 356 is also connected across secondary winding 350, a forward biased diode 358 being provided between the upper terminal of secondary winding 350 and resistor 352. A tap at a point on resistor 354 is connected to base 308 of transistor 300 through the series arrangement of a parallel combination comprising a resistor 360 and the normally closed contacts CP1 of the control power relay CP, and a resistor 364.

Considering the operation of the circuit of FIG. 6, in its qiescent state, i.e., with the turbine not in motion, the 60 cycle A.C. voltage from source 338 is half-wave rectified through diode 340, filtered by capacitor 344 and applied through normally closed contacts CF1 as an operating biasing voltage to transistors 300 and 320. Consequently, transistors 300 and 320 are actuated into conduction and current flows therethrough whereby relay CP is energized. Such energization causes the closing of normally open contacts CP2 whereby an auxiliary power supply 362 is enabled to energize relay CPX, supply 362 suitably being a 115 volts 60 cycle line voltage source. This 115 volts supply can now be utilized to actuate the elements of the system.

Relay CF (not shown) is connected in circuit with regulated positive voltage supply source 108. In the event that alternating current potential is being supplied to sources 108 and 110 whereby the regulated D.C. outputs are provided therefrom, then contacts CF1 open and contacts CF2 close whereby transistors 300 and 320 are connected to source 108. Thus, the circuit fault relay CF enables the sensing of whether there is an output from source 108.

With the energization of relay CPX, the auxiliary A.C. power can be utilized as the A.C. power supply source for D.C. source 108 to effect the energization of the circuit fault relay.

As the turbine shaft is caused to rotate and the speed thereof is brought up, there is applied to base 308 of transistor 300 at a given point in the speed buildup of the system such as at about 3,000 r.p.m., a positive voltage of an amplitude whereby the current in transistor 300 is sufficiently enhanced to reduce the current in transistor 320 sufficiently to effect the energization of relay CP. In this situation, the contacts of relay CP assume their normal positions. Consequently, relay CPX is also de-energized with its contacts also assuming their normal positions, and the output of permanent magnet generator 60 functions as the A.C. power source for regulated D.C. source 108.

In the circuit of FIG. 6, when relay CP is energized contacts CP1 thereof open, thereby affecting the gain of transistors 300 and 320 so as to reduce the net positive increment of voltage required to cause the deenergization of relay CP. This arrangement is utilized to minimize the spread in turbine speed required to produce pull-in and drop-out current in the operating coil of relay CP. Capacitor 332 is included to minimize "chatter" in relay CP during turn-on and turn-off periods. Diode 336 is included to protect transistor 320 from inductive transients produced by the operating coil of relay CP.

Accordingly, it is to be noted that with the circuit of FIG. 6, there is enabled the utilizing of readily available line power to actuate the electrical system in the event that the turbine is not in motion. It is to be further noted that during normal operaion, i.e., with the turbine rotating at sufficient speed, relay CP is in the unenergized state. Thus, during such normal mode of operation, malfunction of relay CP cannot affect the functioning of the system.

Diodes 310 and 312 are included as a protective device to clamp the positive and negative excursions of the voltage appearing at base 308 to chosen values, viz., the forward drops of the diodes respectively.

Regulated negative supply source 110 (FIGS. 2–4) is provided at the time that positive source 108 is switched into the circuit, the contacts of relay CPX effecting the transfer of operation from 60 cycle auxiliary power to the permanent magnet generator whereby, for steady state operation, negative and positive operating biasing potentials may be provided in the system.

*Load Limit Trigger (FIG. 7)*

Figure 7:
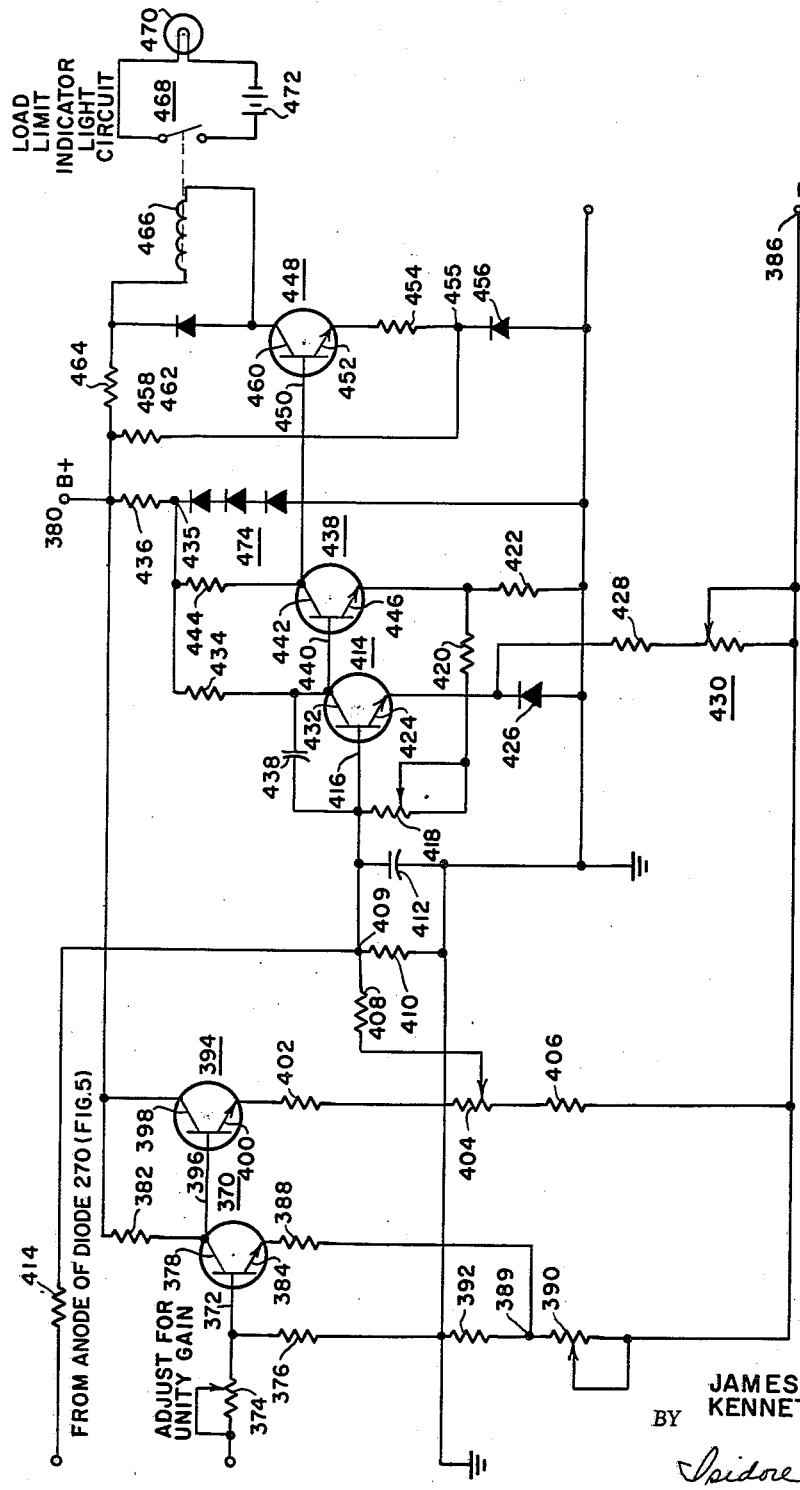
FIG. 7 is a schematic depiction of an example of the load limit trigger and light circuit depicted in FIGS. 2–4.

The circuit schematically depicted in FIG. 7 is an embodiment of load limit trigger stage 124 (FIGS. 2–4) and is utilized to indicate whether diode 270 of FIG. 5 is actually limiting, i.e., the voltage appearing at its anode is at least substantially equal to the voltage at the tapped point on variable resistor 272.

Accordingly, the voltage at the cathode of diode 270 (FIG. 5) is applied to the base 372 of a transistor 370 through a variable resistor 374 which is adjusted to effect a net gain of unity in transistors 370 and 394. The voltage input to base 372 is developed across a resistor 376. The collector 378 is connected to D.C. source 380 through a resistor 382 and the emitter 384 is connected to a negative D.C. source 386 through a resistor 388 and a variable resistor 390. A resistor 392 is included between resistor 390 and common to provide a suitable negative bias at the junction 389 of resistors 388 and 390.

The voltage appearing at collector 378 is directly applied to the base 396 of a transistor 394 which is connected as an emitter follower. In transistor 394, the collector 398 is directly connected to source 380 and the emitter 400 is connected to negative source 386 through the series combination of a resistor 402, a variable resistor 404 and a resistor 406. The tap on resistor 404 is set so that with zero volt input to base 372, there is zero volt output at resistor 404.

The voltage from resistor 404 is applied through a resistor 408 and across a resistor 410. Parallel connected capacitor 412 is included for filtering purposes.

The voltage appearing at the anode of diode 270 in FIG. 5 is applied through a resistor 414, the latter resistor having the same value as resistor 408, to the junction 409 of resistors 408 and 410.

Since the combination of transistors 370 and 394 causes a 180° phase reversal in the signal applied thereto, whereby the positive input voltage is a negative output voltage, in the event that diode 270 is performing a limiting function, the voltage at junction 409 is substantially zero plus whatever forward drop there is across diode 270. However, in the event that the voltage at the anode of diode 270 is less than the limiting voltage, the voltage appearing at junction 409 is negative.

The remainder of the circuit of FIG. 6 comprises three NPN transistors connected in cascade. It is seen that in the event that the voltage at junction 409 is negative, the conduction in the second transistor is increased and the conduction in the input and output transistors is decreased. The values of the circuit components are so chosen whereby if diode 270 is performing a limiting function, a relay is energized to cause the closing of contacts associated therewith whereby an indicating lamp is connected in circuit with a voltage source and is thereby illuminated.

In this remaining portion of the circuit, the base 416 of a transistor 414 is connected to common through a variable resistor 418, a resistor 420 and a resistor 422. The emitter 424 is connected to common through the cathode to anode path of a diode 426, diode 426 serving to clamp the potential at emitter 414 to a negative potential equal to the forward drop of this diode. Diode 426 is suitably chosen to have a temperature coefficient substantially equal to the temperature coefficient of the base emitter junction of transistor 414 thereby substantially compensating for temperature variations in this junction. Emitter 424 is connected to a negative source 386 through the series arrangement of a resistor 428 and a variable resistor 420. The collector 432 is connected to the positive source 380 through a resistor 434 and a resistor 436. A feedback capacitor 438 is included to limit the high frequency response to undesirable noise voltages.

The output at collector 432 is directly applied to the base 440 of a transistor 438, the collector 442 of transistor 438 being connected to the junction 435 of the resistors 434 and 436 through a resistor 444 and the emitter 446 being connected to common through resistor 422.

The output at collector 442 is applied directly to the base 450 of an output transistor 448. The emitter 452 of transistor 448 is connected to common through the series combination of a resistor 454 and the cathode to anode path of a diode 456, the junction 455 of diode 456 and resistor 454 being connected to source 380 through a resistor 458. Diode 456 may suitably be a Zener diode for regulating the emitter 452 bias voltage. The collector 460 of transistor 448 is connected to source 380 through the anode to cathode path of a diode 462 and a resistor 464. The operating coil 466 of a relay is connected across diode 462, contacts 468 being closed upon the actuation of coil 466 to place indicating light 470 in circuit with potential source 472. Diode 462 is provided to minimize the effects caused by inductive transients on transistor 448 as produced by coil 466. The bank of diodes generally designated by the numeral 474 are included to regulate the voltage at junction point 435, i.e., to insure that this junction voltage does not rise above a chosen level.

*Extraction Pressure Transducer, Transducer Balance and Excitation and Amplifier and Demodulator (FIG. 8)*

Figure 8:
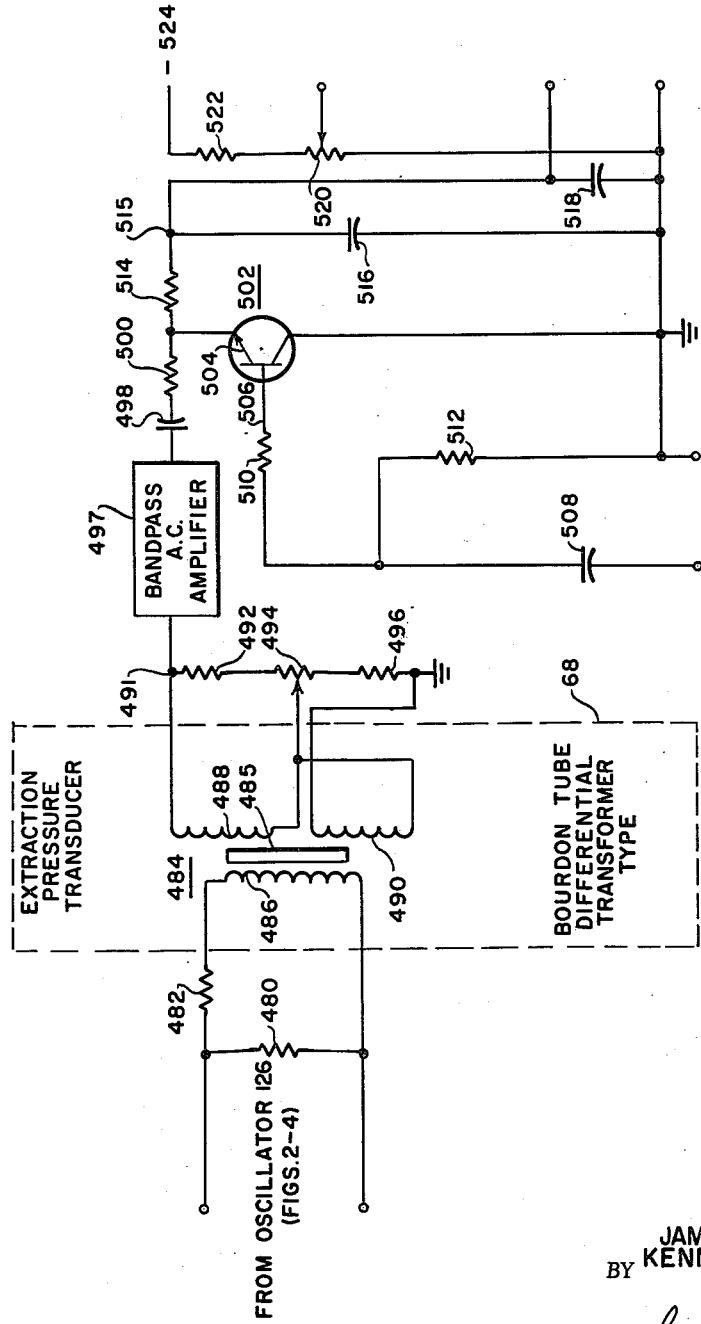
FIG. 8 is a diagram partially schematic and partly in block form of an example of the respective extraction pressure transducer, the transducer balance and excitation, and the amplifier and demodulator stages respectively shown in block form in FIGS. 2–4.

In FIG. 8, there are shown examples of circuits which may be utilized as the high pressure and low pressure conduit extraction pressure transducers 62 and 64, the high pressure and low pressure transducer balance and excitation stages 128 and 179 and the amplifier and demodulator stages 130 and 180 respectively. It is of course understood that the values of the circuit components in these examples are chosen whereby the desired effects are produced in the high pressure conduit and low pressure conduit channels respectively.

In the arrangement of FIG. 8, the output from oscillator 126 (FIGS. 2–4) is applied across a resistor 480 and through a resistor 482 to the primary winding of a differential transformer 484. Connected between the upper terminals of secondary windings 488 and 490 is the series arrangement of a resistor 492, a variable resistor 494 and a resistor 496, the upper terminal of winding 490 being connected to common, the lower terminals of windings 488 and 490 being connected together by a tap to a point on variable resistor 494. Provided in transformer 484 is a movable magnetic core 485 whose position may be varied in response to the pressure applied to a pressure sensitive device such as a Bourdon tube (not shown), the signal induced by primary winding 486 in the secondary windings depending upon the position of such core. A null at a desired pressure is obtained by a mechanical adjustment of core 485 of transformer 484 at its mechanical attachment to the Bourdon tube, the core being preferably symmetrically disposed between windings 488 and 490. Variable resistor 494 permits a fine adjustment for minimizing the null voltage at such null pressure (voltages introduced by phase effects).

The signal appearing at junction 491 is applied to a transistorized bandpass A.C. amplifier 497 having a bandpass frequency characteristic for the band of frequencies included between a frequency of a few hundred cycles less than the frequency of oscillator 126 and a few hundred cycles greater than the frequency of oscillator 126.

The output from A.C. amplifier 497 is applied to the emitter 504 of a transistor 502 through a series connected capacitor 498 and a resistor 500. The output from the square wave generator portion of stage 126 is applied to the base 506 of transistor 502 through a capacitor 508 and a resistor 510, the junction of resistor 510 and capacitor 508 being connected to common through a resistor 512.

Transistor 502 is connected so as to provide inverted operation if the input to emitter 504 is sufficiently low, such as about 0.1 volt more or less. Thus, at such or lower voltages, transistor 502 is conductive whether the voltage applied to emitter 504 is negative or positive. Above such low voltage values, transistor 502 functions in the normal NPN mode of operation whereby transistor 502 is conductive when base 506 is positive with respect to emitter 504. To understand the operation of transistor 502, it is to be realized that at this point in the circuit, it is desired to chop negative voltages when the phases of the square wave and the amplified A.C. voltage are the same respectively, such common phase relationship being chosen to occur at pressures less than the null pressure as determined by the transducer balancing arrangement.

The output at emitter 504 is applied through a series connected resistor 514 and filtered by parallel connected capacitors 516 and 518 to provide a unidirectional potential output reflecting the unidirectional potential component of the positive values of the A.C. output of amplifier 497. The output of the arrangement of FIG. 8 is applied as an input to a pressure summer such as the high pressure conduit pressure summer 134 or the low pressure conduit pressure summer 181 (FIGS. 2–4). The arrangement of FIG. 8 accordingly provides a unidirectional potential at its output which is proportional to the drop in pressure from a given base pressure.

In FIG. 8, there is also shown the arrangement for providing a signal representing a desired pressure level. This arrangement includes a series arrangement of a variable resistor 520 which may be one of the pressure level set potentiometers that are controlled by knobs 132 and 178 respectively (FIGS. 2–4) and a resistor 522 connected between common and negative source 524. The voltage is taken from resistor 520 by a tap and is applied as a second input to one of the pressure summers, viz., summer 134 and summer 181.

*Operational Summing Amplifier (FIGS. 9 and 10)*

Figure 9:
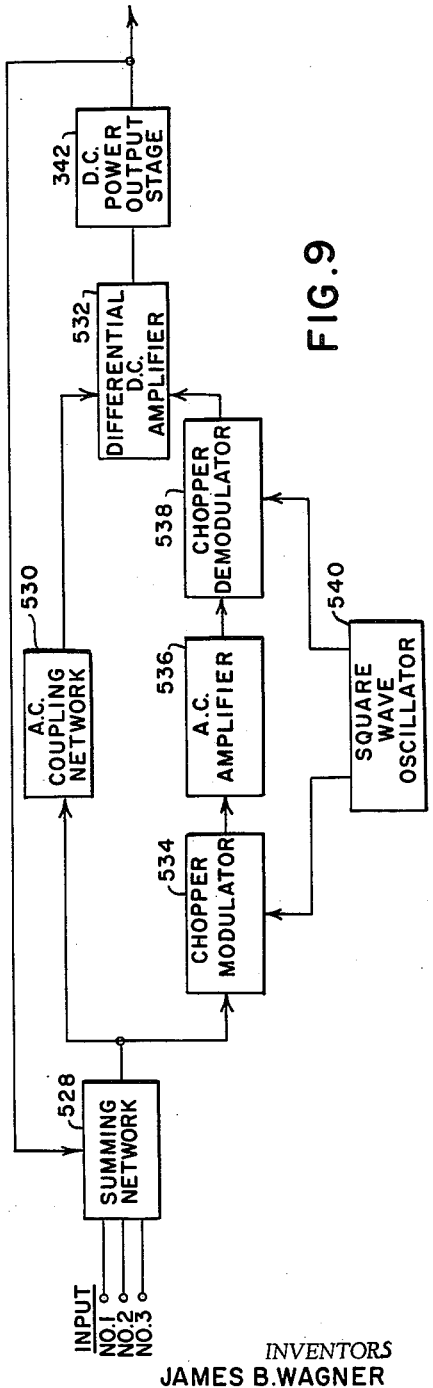
FIG. 9 is a block diagram of an example of the operational summing amplifier utilized in the system of this invention.

In FIG. 9, there is shown a block diagram of an operational summing amplifier suitable for use as the summer stages of the system of this invention. The active elements in the depicted blocks are preferably transistors. In such amplifier, there is provided an adder network as disclosed in the block diagram depicted in FIG. 10.

Figure 10:
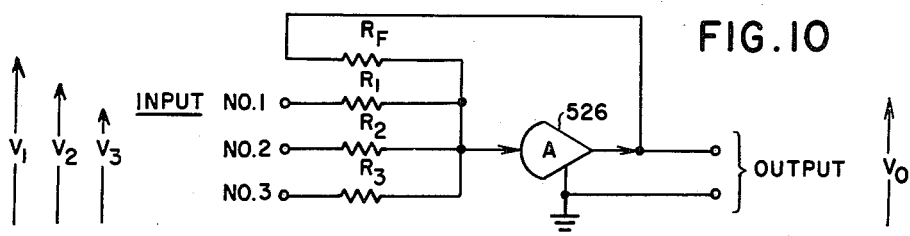
FIG. 10 is a block diagram of a summing amplifier suitably utilized in the operation of the amplifier of FIG. 9.

In FIG. 10, a plurality of inputs, designated for convenience as inputs No. 1, 2 and 3, respectively, are combined in a passive network comprising resistors $R_1$, $R_2$ and $R_3$, the voltage resulting from such combination being applied as an input to a transistorized D.C. amplifier 526. Amplifier 526 is characterized by high gain and provides a 180° phase reversal over a suitable useful frequency range. Connected across amplifier 526, i.e., between its input and output, is a feedback resistor $R_f$. In the circuit of FIG. 10, with amplifier 526 chosen to have a very high gain, then the output voltage $$V_0 = -\frac{R_f}{R_1}V_1 - \frac{R_f}{R_2}V_2 - \frac{R_f}{R_3}V_3$$

wherein $V_1$, $V_2$ and $V_3$ are the input voltages.

Referring back to FIG. 9, the output of summing network 528, which is of the type shown in FIG. 10, is applied as one input to a differential amplifier 532 through an A.C. coupling network 530 which is suitably a blocking capacitor. The output of summing network 528 is also applied to an arrangement comprising a chopper modulator 534, a transistorized A.C. amplifier 536 and a chopper demodulator 538, a square wave oscillator 540 being provided, the output of which is applied as an input to modulator 534 and demodulator 538 respectively.

In differential amplifier 532, which is chosen to be of the single ended output type, there are combined and amplified the output from the A.C. coupling network 530 which comprises the high frequency components of the output of summing network 528, and the output of the chopper demodulator 538 which comprises the D.C. and low frequency components of the output of summing network 528. The output of differential amplifier 532 is an amplified replica of the output of summing network 528.

The output of differential amplifier 532 is applied to a D.C. power amplifier 542. The output of D.C. power amplifier 542 is fed back to the input of the feedback resistor $R_f$ as depicted in FIG. 10.

Typically, the values of the circuit components comprising the operational amplifier of this system as shown in FIG. 9 are chosen so as to provide an output voltage which is proportional to the negative algebraic sum of the input voltages and having a numerical output value within a suitable range such as between plus and minus five volts.

*$V_1$ Summer (FIG. 11)*

In the circuit of FIG. 11, the output from speed sensing and adjusting stage 104 (FIGS. 2–4) is applied as one input to an adder network and the outputs from adjusting networks 136 and 182 are applied as the other two inputs to the adder network.

The output from speed sensing and adjusting stage 104 is applied through a resistor 544 and developed across the series combination of a variable resistor 546 and resistor 548. The voltage taken by a tap on resistor 546 is applied as an input to a D.C. amplifier 550 through a resistor 552. The output from adjusting network 136 (FIGS. 2–4) is applied to junction 553 through a series arrangement of a variable resistor 554 and a resistor 556 and the output of adjusting network 182 (FIGS. 2–4) is applied to junction 553 through a variable resistor 555 and a resistor 557. Amplifier 550 is a high gain D.C. amplifier which provides a 180° phase shift between input and output voltages. The parallel combination of a capacitor 558 and a resistor 560 is connected between the input and the output of amplifier 550.

The values of the resistors in the circuit of FIG. 11 are so chosen whereby there is provided at the output of amplifier 550, a unidirectional potential proportional to the sum of the speed signal and the outputs of pressure summers 134 and 181 (FIGS. 2–4). The value of capacitor 558 is chosen to limit the net frequency response to only those frequencies necessary to faithfully reproduce significant transient information, i.e., rates of response for control response, such value preferably being one where the response is no higher than a value such as about 100 c.p.s. to minimize the influence of circuit noise, etc. The values of the resistors are so chosen whereby the net summing gain of the circuit is such that the movements of the inlet valves are influenced in a proportional manner in response to changes in speed and pressures in the high and low pressure extraction conduits. The specific gain values are determined by the particular design of the turbine, mechanical advantage between ram motion, steam valve lift, and desired speed and pressure regulation. For a chosen turbine design, a suitable gain may fall in the range of 0.5 to 2.

*Pressure Summer (FIG. 12)*

Figure 12:
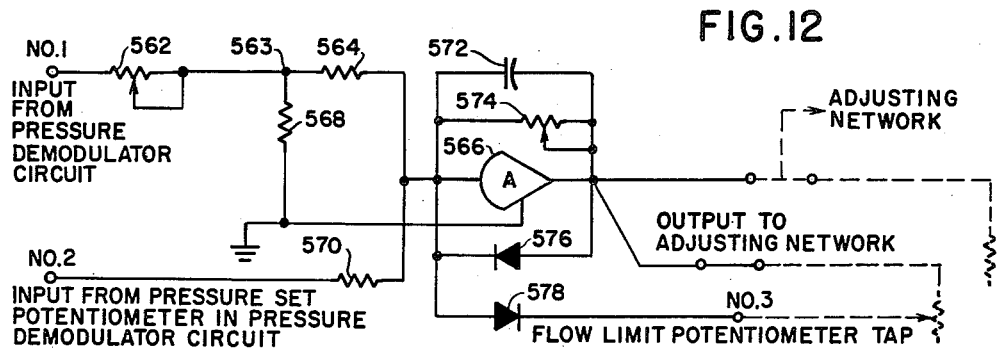
FIG. 12 is a diagram of a suitable example of the pressure summers respectively shown in block form in FIGS. 2–4.

The circuit of FIG. 12 may suitably be utilized as the high pressure conduit pressure summer 134 and the low pressure conduit pressure summer 181 respectively of FIGS. 2–4. In this circuit, a first input thereto, viz., input No. 1, is the output of an amplifier and demodulator stage such as stages 130 and 180. A second input thereto (input No. 2) is the output from a pressure level set potentiometer such as the potentiometers contained in stages 130 and 180 and whose settings are respectively controllable by knobs 172 and 178.

The output from an amplifier and demodulator stage is applied through a series connected variable resistor 562 and a resistor 564 to the input of amplifier 566, the junction 563 of resistors 562 and 564 being connected to common through a resistor 568.

The output from a pressure level set potentiometer is applied as an input to amplifier 566 through a resistor 570. Connected between the input and output of amplifier 566 which is chosen to be a D.C. amplifier having a high gain and a 180° phase shift, is the parallel combination of a capacitor 572 and a variable resistor 574. Connected between the output and the input of amplifier 566 is the anode to cathode path of a diode 576.

A third input to amplifier 566 is a voltage obtained by the tap on a flow limit set potentiometer such as the potentiometers contained in adjusting networks 136 and 182 and whose settings are respectively externally controlled by knobs 140 and 186 (FIGS. 2–4). This input is applied through the cathode to anode path of a diode 578.

The output of amplifier 566 provides two inputs to an adjusting network as is further explained hereinbelow.

With regard to input No. 1 to the presssure summer, variable resistor 562 provides an adjustment in the summing gain for input No. 1. The values for resistors 564 and 578 are chosen so as to satisfy the requirement for the magnitude of the desired summing gain and the discharge time constant resulting from their combination with the filter capacitors such as capacitors 516 and 518 of the circuit of FIG. 8. The selected gain results from the consideration of a particular design of a turbine. With regard to the input provided from the setting on a pressure level set potentiometer, the value of resistor 570 is so chosen as to provide a selected gain for input No. 2.

In the parallel combination shunting amplifier 566, variable resistor 574 is chosen to have a value whereby there is permitted an adjustment for the summing gain for both inputs No. 1 and No. 2 in accordance with the equation set forth in connection with the description of the summing amplifier of FIG. 9. Capacitor 572 is chosen to have a value so as to provide a high frequency response such that those frequency components required for control purposes are passed with substantially no attenuation. Typically, such high frequency response may be limited to 100 c.p.s.

Diode 576 is included to provide a limiting action such that substantially no positive output is passed through the output of the amplifier. Diode 578 in combination with a flow limit potentiometer (contained in adjusting network 136 and adjusting network 182 respectively—FIGS. 2–4) is included to provide an adjustable limit to the negative output voltage. Accordingly, at the output of the circuit, there is provided a negative voltage proportional to the negative of the algebraic sum (amplifier 566 produces a 180° phase shift) of voltages proportional to the voltages applied at inputs Nos. 1 and 2.

Typically, the summing gain for either of the inputs or the output of amplifier 566 is in the range from one to three depending upon a particular turbine design.

*Adjusting Network (FIG. 13)*

The circuit of this fig. is suitably utilized as an embodiment of adjusting network 136 or adjusting network 182 in FIGS. 2–4. In this circuit, the output of a pressure summer such as shown in FIG. 12, and hereinabove described, is applied through a variable resistor 580 as a first input to the $V_1$ summer 122 (FIGS. 2–4) and as an input to an inverter 138 or 183. The output of a pressure summer is also applied together with a D.C. voltage existing at point 585 from a regulated voltage source 592 through a variable resistor 582 (the flow limit set potentiometer contained in the adjusting networks whose settings are externally controllable by knobs 140 and 186 respectively as shown in FIGS. 2–4.) The voltage existing at a tap point on variable resistor 582 is applied as the No. 3 input to a pressure summer. Connected between point 585 and common is variable resistor 586, a resistor 588, a variable resistor 590, and a resistor 594. In adjusting network 136, variable resistors 580 and 590 are mechanically attached to their controlling knob, i.e., knob 142 (FIGS. 2–4), as is resistor 590 of adjusting network 182, as has been explained hereinabove, and are ganged such that the adjustment of one results in a corresponding adjustment in the other.

The setting on flow limit set potentiometer 582 provides reverse bias voltage as has previously been described in connection with the description of the operation of a pressure summer (FIG. 12). Resistor 580, variable resistor 590, and resistor 594 have values chosen so that together with the adjusted value chosen for variable resistor 586, the potential existing at the tap point of variable resistor 590 and applied as an input to the $V_2$ summer 150 or the $V_3$ summer 184 produces the desired index or lead position of the high pressure conduit extraction valve $V_2$ and the low pressure conduit extraction valve $V_3$ relative to the input valves.

To permit economy operation, i.e., minimal throttling losses due to fluid flow through the extraction valves, $V_2$ and $V_3$ (straight condensing operation), provision is made for sufficiently opening extraction valves $V_2$ and $V_3$ to a position in accordance with a particular design where there results a negligible pressure drop across the extraction valves. Accordingly, if the tap on variable resistor 590 is at point 595 and in accordance with a suitable chosen value of the portion of resistor 590 between points 595 and 589, the voltage appearing at point 595 has a value which represents a position of the high pressure conduit extraction valve $V_2$ corresponding to the necessary position for such economy operation. Of course, the value of resistor 590 is chosen relative to the value of resistor 594 to effect these results. Their ratio is substantially equal to the ratio of the index position degree of opening and the economy operation degree of opening of the high pressure conduit extraction valve $V_2$.

Figure 13:
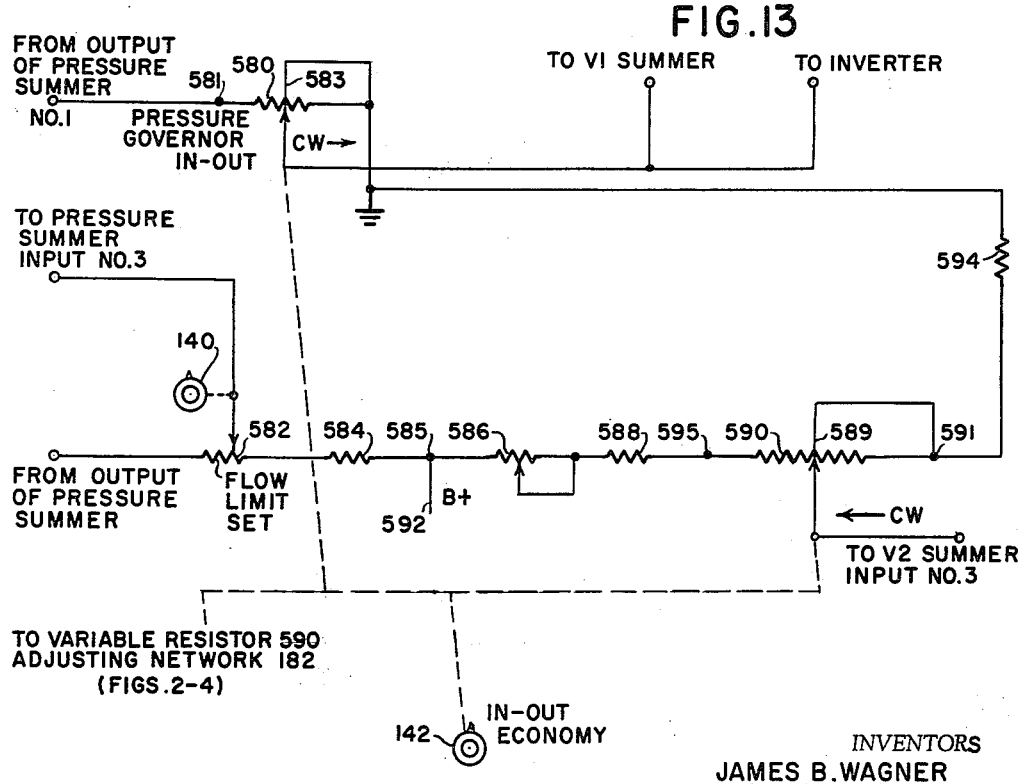
FIG. 13 is a diagram of a suitable example of the adjusting networks respectively shown in block form in FIGS. 2–4.

It is noted in FIG. 13 that variable resistors 580 (pressure governor in-out) and 590 (economy) are ganged. With regard to variable resistor 580, when the tap is either at point 583 or at common, the inputs to $V_1$ summer 122 and to inverter 138 are respectively at common potential. When the tap is at point 581, the inputs to $V_1$ summer 122 and inverter 138 respectively are the full output of pressure summer 134. The rotational characteristics of variable resistors 580 and 590 are so chosen that when the tap of variable resistor 580 is moved to point 581, the taps on variable resistors 590 in adjusting networks 136 and 182 are both respectively moved to point 591. With this arrangement, there is effected the utilization of the full pressure adjusting signal for control of the turbine extraction opening pressure, the appropriate indexing of the extraction valves being effected by the concurrent positions of the respective taps of variable resistor 590 at point 591 in both of the adjusting networks. When the tap on variable resistor 580 is placed at point 583, the inputs to $V_1$ summer 122 and inverter 138 are at common potential whereby no pressure control signal is utilized. Concurrently, the taps on variable resistors 590 in both of the adjusting networks are mechanically positioned at points 589 and the extraction valves $V_2$ and $V_3$ are accordingly still at the desired respective index positions. Now, when the tap on variable resistor 580 in adjusting network 136 is moved to common, here again the inputs to $V_1$ summer 122 and inverter 138 are at common potential but the respective taps on variable resistors 590 in adjusting networks 136 and 182 have been moved simultaneously to points 595 to effect economy operation as hereinabove explained.

It is to be noted that the arrangement of variable resistors 580 and 590 provides a means for insuring a smooth transition devoid of undesirable transients when the change is made from economy to pressure control operation. Conveniently, the midpoint positions for both variable resistors 580 and 590 are utilized when the turbine is first started up.

$V_2$ Summer (FIG. 14)

In this FIG. 14, there is shown a schematic depiction of a circuit suitable for use as $V_2$ summer 150 of FIGS. 2–4.

The number one input in the circuit is the output from speed sensing and adjusting stage 104 and is applied to summing point 621 through the series arrangement of a variable resistor 614 and a resistor 616. The number two input is the output of inverter 138 which is the inverted output of the high pressure conduit pressure summer 134 as taken from the tap point on variable resistor 580 in the adjusting network (FIG. 13) and is applied to summing point 621 through a variable resistor 618 and a resistor 620. The number three input is the signal taken from the tap point on variable resistor 590 in the adjusting network (FIG. 13) and is applied to summing point 621 through a resistor 622. The number four input is the output of the low pressure conduit pressure summer 181 (FIGS. 2–4) as taken from variable resistor 580 in adjusting network 182 and is applied to summing point 621 through a variable resistor 630 and a resistor 632.

The voltage appearing at summing point 621 is applied to an amplifier 612 which is a high gain D.C. amplifier that provides an output signal 180° out of phase with the input thereto. Connected between the input and output of amplifier 612 is a parallel combination of a capacitor 624 and a resistor 626.

With regard to the values of the resistors and capacitors in the circuit of FIG. 14, they are chosen to provide proper summing gain values and desirable frequency response characteristics respectively in accordance with a chosen turbine design. Such values are determined for reasons similar to those which determine the value of the circuit components of $V_1$ summer 122 and pressure summers 134 and 181 as hereinabove explained.

$V_3$ Summer (FIG. 15)

The circuit of FIG. 15 is substantially similar to the circuit of FIG. 14 and is suitably utilizable as $V_3$ summer 183 of FIGS. 2–4.

In this circuit, the number one input which is the output from inverter 138 in the high pressure conduit extraction channel is applied to summing point 640 through a variable resistor 636 and a resistor 638. The number two input is the output of speed sensing and adjusting stage 104 and is applied to summing point 640 through a variable resistor 642 and a resistor 644. The number three input is the output of inverter 183 and, accordingly, is the inversion of the output of low pressure conduit pressure summer 181 as taken from the tap point on variable resistor 580 in the adjusting network (FIG. 13), the number three input being applied to summing point 640 through a variable resistor 646 and a resistor 648. The number four input is the output taken at the tap point on variable resistor 590 in the adjusting network (FIG. 13) and which is the voltage that controls the initial position of the $V_3$ extraction valve, the number four input being applied to summing point 640 through a resistor 650. The voltage appearing at summing point 640 is applied to a high gain D.C. amplifier 652 which provides an output signal 180° out of phase with respect to the phase of the input thereto. Connected between the input and output of amplifier 652 is the parallel combination of a capacitor 654 and a resistor 656.

As in the case of the $V_2$ summer depicted in FIG. 14, the values of the resistors and capacitors in the circuit of FIG. 15 are chosen to provide the proper summing gain values and desirable frequency response characteristics respectively for a selected turbine design. Such values are determined for reasons similar to those which determine the value of the circuit components in $V_1$ summer 122, $V_2$ summer 150 and pressure summers 134 and 181 (FIGS. 2–4), as hereinabove explained.

FIG. 16 shows the arrangement for energizing relay SCT. It is seen that when the normally open contacts of relay CPX close due to the energization thereof, relay SCT is energized. FIG. 17 shows the normal position of contacts SCT-1.

In the system as described, it is to be understood that the active elements, rectifiers, diodes, etc., which are utilized are of the semiconductor type, such as transistors, etc. Those circuits which have not been described in detail are transistorized circuits well known in the art and their detailed description has been deemed unnecessary.

While there have been described what are considered to be preferred embodiments of this invention, it will be obvious to those skilled in the art that various changes and modifications may be made therein without departing from the invention and it is, therefore, aimed in the appended claims to cover all such changes and modifications as fall within the spirit and scope of the invention.

What is claimed as new and desired to be secured by Letters Patent of the United States is:

1. In an elastic fluid multi-stage turbine which includes a rotatably mounted output shaft, inlet valve means governing the flow of fluid to said turbine, first and second extraction conduits connected to first and second intermediate stages of said turbine, first extraction valve means which governs the proportion of fluid which flows from the first intermediate stage to a succeeding stage of said turbine, and second extraction valve means which governs the proportion of fluid which flows from the second intermediate stage to a succeeding stage of said turbine; the combination comprising means responsive to the speed of said output shaft for generating a first electric signal which is a function of said speed, means responsive to the pressure in said first extraction conduit for generating a second electric signal which is a function of the pressure in said first conduit, means responsive to the pressure in said second extraction conduit for generating a third electric signal which is a function of the pressure in said second conduit, means in circuit with said generating means for modifying said first signal with said second and third signals, for modifying said second signal with said first and third signals, and for modifying said third signal with said first and second signals, a first network controlled by said modified first signal for governing the position of said inlet valve means, a second network controlled by said modified second signal for governing the position of said first extraction valve means, and a third network controlled by said modified third signal for governing the position of said second extraction valve means to thereby selectively control both the speed of said output shaft and the fluid pressure in said first and second extraction conduits.

2. In an elastic fluid multi-stage turbine which includes a rotatably mounted output shaft, inlet valve means governing the flow of fluid to said turbine, first extraction valve means governing the flow of said fluid from a first intermediate stage to a succeeding stage of said turbine, second extraction valve means governing the flow of said fluid from a second intermediate stage to a succeeding stage of said turbine, a first extraction conduit connected to said first intermediate stage of said turbine and a second extraction conduit connected to a second intermediate stage of said turbine; the combination comprising first means responsive to the speed of said output shaft for generating a first electric signal which is a function of said speed, second means responsive to the pressure in said first extraction conduit for generating a second electric signal which is a function of the pressure in said first conduit, third means responsive to the pressure in said second conduit for generating a third electric signal which is a function of the pressure in said second conduit, said second generating means including means for producing equal valued second electric signals of opposite polarity, said third generating means including means for producing third electric signals of equal value and of opposite polarity respectively, first means in circuit with said first generating means for modifying said first electric signal with said second and third signals of one polarity, second means in circuit with said generating means for modifying said second electric signal of the opposite polarity with said first and third signals of said one polarity, third means in circuit with said generating means for modifying said third electric signal with said first signal and said second signal of said opposite polarity, a first network controlled by said first modified signal for governing the position of said inlet valve means, a second circuit network controlled by said second modified signal for governing the position of said first extraction valve means and a third circuit network controlled by said third modified signal for governing the position of said second extraction valve means.

3. In an elastic fluid multi-stage turbine as defined in claim 2 wherein said inlet valve means comprises upper and lower inlet valve mechanisms, and wherein said first circuit network comprises first and second circuit arrangements, said first modified signal controlling said first and second circuit arrangements to govern the position of said first and second inlet valve mechanisms respectively.

4. In an elastic fluid multi-stage turbine as defined in claim 2 wherein said output shaft speed responsive means comprises a permanent magnet generator having a selected number of pairs of poles, the frequency of an alternating current signal produced thereby being equal to the speed of said output shaft multiplied by said number.

5. In an elastic fluid multi-stage turbine as defined in claim 2 wherein said first electric signal is a unidirectional potential signal and wherein said first generating means includes means for providing a voltage level having a value about which variations of shaft speed are referenced.

6. In an elastic fluid multi-stage turbine as defined in claim 5 wherein said shaft includes a variable load and wherein said first generating means includes means for providing a voltage having a value which represents a maximum speed for said shaft in the absence of any load.

7. In an elastic fluid multi-stage turbine as defined in claim 6 wherein said means for deriving said first electric signal further includes means for providing a limiting voltage having a value which represents a maximum degree of opening permitted of said inlet valve means and said extraction valve means in response to changes in shaft speed and load independent of the value of said voltage about which said variations of said shaft speed are referenced and the voltage representing said maximum speed in the absence of said load.

8. In an elastic fluid multi-stage turbine as defined in claim 7 and further including means responsive to the output of said first generating means for indicating whether said output is at least equal to said limiting voltage.

9. In an elastic fluid multi-stage turbine as defined in claim 2 wherein said first modifying means comprises first summing means wherein there are algebraically added said first electric signal and said second and third electric signals of said one polarity.

10. In an elastic fluid multi-stage turbine as defined in claim 2 wherein said second modifying means comprises second summing means wherein there are algebraically added said first electric signal, said second electric signal of said opposite polarity and said third electric signal of said one polarity.

11. In an elastic fluid multi-stage turbine as defined in claim 10 wherein there are further included first indexing means for providing a voltage which represents a chosen initial position of said first extraction valve means relative to the position of said inlet valve means and wherein said last named voltage is algebraically added in said second summing means with said first electric signal, said second electric signal of said opposite polarity and said third electric signal of said one polarity.

12. In an elastic fluid multi-stage turbine as defined in claim 2 wherein said third modifying means comprises third summing means wherein there are algebraically added said first electric signal, and said second and third electric signals of said opposite polarity respectively.

13. In an elastic fluid multi-stage turbine as defined in claim 12 wherein there are further included second indexing means for providing a voltage which represents a chosen initial position of said second extraction valve means relative to the position of said inlet valve means and wherein said last named voltage is algebraically added in said third summing means to said first electric signal, and said second and third electric signals of said opposite polarity respectively.

14. In an elastic fluid multi-stage turbine as defined in claim 2 wherein said first, second and third circuit networks include respectively first, second, and third like transducing means for generating a voltage having an amplitude which is a function of the degree of movement of a valve means respectively from a chosen position.

15. In an elastic fluid multi-stage turbine as defined in claim 14 wherein said first, second and third networks respectively include fourth, fifth and sixth means respectively responsive to the outputs of said first, second and third transducer means for deriving respective first, second and third unidirectional potentials which represent the positions of said inlet valve means, said first extraction valve means and said second extraction valve means respectively.

16. In an elastic fluid multi-stage turbine as defined in claim 15 wherein there are included summing means for algebraically adding said first modified signal and said first unidirectional potential, summing means for algebraically adding said second modified signal and said second unidirectional potential and summing means for algebraically adding said third modified signal and said third potential.

17. In an elastic fluid multi-stage turbine as defined in claim 2 wherein said means for generating said second and third electric signals includes first and second transducer means respectively, said first and second transducer means providing first and second alternating current voltages having amplitudes respectively proportional to the pressure in said first and second extraction conduits, first and second means for balancing the outputs of said first and second transducer means to null voltages at first and second predetermined maximum pressures and third and fourth means responsive to the outputs of said balancing means for converting said third and fourth signals to first and second unidirectional potentials which represent deviations of the pressures in said extraction conduits from said respective maximum pressure.

18. In an elastic fluid multi-stage turbine as defined in claim 17 wherein there are further included means for providing chosen reference voltages to establish chosen reference pressure levels in said extraction conduits respectively at which said turbine is to normally operate, said chosen voltages respectively not exceeding the magnitudes of the voltages representing said predetermined maximum pressures.

19. In an elastic fluid multi-stage turbine as defined in claim 18 where there are further included means for providing a flow limit voltage which represents a maximum flow of elastic fluid through said first extraction conduit, means for providing a flow limit voltage which represents a maximum flow of elastic fluid through said second extraction conduit, means for algebraically summing the unidirectional potential signal representing deviation from pressure in said first extraction conduit from said predetermined maximum pressure, said chosen reference voltage and said flow limit voltage for said first extraction conduit, means for algebraically summing the unidirectional potential signal representing the deviation in pressure in said second extraction conduit from said predetermined maximum pressure, said chosen reference voltage and said flow limit voltage for said second extraction conduit whereby the outputs of said summing means are unidirectional potentials which respectively represent a deviation in pressure in an extraction conduit from said chosen reference pressure and flow limit up to a given maximum for said conduit.

20. In an elastic fluid multi-stage turbine as defined in claim 2 wherein there are further included transducer means responsive to speed of said output shaft for deriving an alternating current electric signal having an amplitude proportional to said speed and means responsive to a speed which is less than a predetermined speed for providing a source of electrical power to said combination and for causing the switching from said source to the output of said transducer means as a power source for said combination upon the attaining of a speed at least equal to said predetermined speed.

No references cited.